US009388270B2

(12) United States Patent
Van Der Woude et al.

(10) Patent No.: US 9,388,270 B2

(45) Date of Patent: Jul. 12, 2016

(54) FIBER REINFORCED POLYMERIC COMPOSITES AND METHODS OF MAKING THE SAME

(75) Inventors: Jacobus Hendricus Antonius Van Der Woude, Leek (NL); Jacob Cornelis Dijt, Eelde (NL); Hendrik Beerda, Assen (NL); Johannes Leonardus Tabak, Groningen (NL); John Theo Penning, Tynaarlo (NL)

(73) Assignee: PPG Industries Ohio, Inc., Cleveland, OH (US)

(*) Notice: Subject to any disclaimer, the term of this patent is extended or adjusted under 35 U.S.C. 154(b) by 20 days.

(21) Appl. No.: 12/703,974

(22) Filed: Feb. 11, 2010

(65) Prior Publication Data

US 2010/0203331 A1 Aug. 12, 2010

Related U.S. Application Data

(60) Provisional application No. 61/151,683, filed on Feb. 11, 2009.

(51) Int. Cl.

| | |
|---|---|
| ***C08J 5/04*** | (2006.01) |
| ***C08J 5/08*** | (2006.01) |
| ***C03C 25/26*** | (2006.01) |
| ***C08G 18/28*** | (2006.01) |
| ***C08G 18/80*** | (2006.01) |
| ***C08L 75/04*** | (2006.01) |

(52) U.S. Cl.

CPC .............. *C08G 18/289* (2013.01); *C03C 25/26* (2013.01); *C08G 18/8074* (2013.01); *C08G 18/8077* (2013.01); *C08J 5/04* (2013.01); *C08J 5/08* (2013.01); *C08L 75/04* (2013.01); *C08J 2375/04* (2013.01); *Y10T 428/24994* (2015.04); *Y10T 428/249948* (2015.04); *Y10T 428/2933* (2015.01); *Y10T 428/2962* (2015.01)

(58) Field of Classification Search

CPC ............ C08J 2375/04; C08J 5/08; C08J 5/06; Y10T 428/2933; Y10T 428/2962; Y10T 428/24994; Y10T 428/249948; C03C 25/26

USPC ........... 428/357, 145, 149, 160, 293.4, 295.7, 428/304.4, 312.6, 299.4, 300, 108, 391, 428/375, 378, 380-383, 296.1, 296.4, 428/295.1, 297.4, 298.7, 300.1; 442/180

See application file for complete search history.

(56) References Cited

U.S. PATENT DOCUMENTS

| | | | | |
|---|---|---|---|---|
| 3,459,585 | A | 8/1969 | Killmeyer et al. | |
| 4,582,879 | A | 4/1986 | Frisch et al. | |
| 4,659,753 | A | 4/1987 | Tiburtius et al. | |
| 4,697,009 | A | 9/1987 | Deschler et al. | |
| 4,939,234 | A * | 7/1990 | Tonti et al. | 528/315 |
| 5,157,074 | A * | 10/1992 | Metzger et al. | 524/589 |
| 5,236,982 | A * | 8/1993 | Cossement et al. | 524/188 |
| 5,837,181 | A | 11/1998 | Leimbacher et al. | |
| 7,419,721 | B2 | 9/2008 | Beerda et al. | |
| 2005/0136237 | A1 * | 6/2005 | Beerda et al. | 428/297.4 |
| 2007/0079730 | A1 | 4/2007 | Puckett et al. | |
| 2008/0160281 | A1 | 7/2008 | Vickery et al. | |
| 2008/0241533 | A1 | 10/2008 | Dijt et al. | |
| 2009/0137175 | A1 * | 5/2009 | Van Der Woude et al. | 442/187 |
| 2010/0280239 | A1 | 11/2010 | Shooshtari et al. | |
| 2010/0286343 | A1 | 11/2010 | Burghardt et al. | |
| 2010/0305269 | A1 | 12/2010 | Gleich et al. | |
| 2011/0021737 | A1 | 1/2011 | Tadepalli et al. | |
| 2011/0045275 | A1 | 2/2011 | Tadepalli et al. | |
| 2011/0180957 | A1 | 7/2011 | Burghardt et al. | |

FOREIGN PATENT DOCUMENTS

| | | |
|---|---|---|
| JP | 60-096549 | 5/1985 |
| JP | H 05-220852 | 8/1993 |
| JP | H 09-202854 | 8/1997 |
| JP | 2010-173291 | 8/2010 |
| WO | WO 92/18433 | 10/1992 |

OTHER PUBLICATIONS

Patent Cooperation Treaty, Transmittal of International Preliminary Report on Patentability, Application No. PCT/US2010/023846, mailed Aug. 25, 2011.

Barhoumi, N. et al., A Reactive Rotational Molding Process of PP/PA6 Bilayer Systems: Experimental Investigations, Ingenierie des Materiaux Polymeres-(IMP/LMM), UMR-CNRS 5223, INSA Lyon, Universite de Lyon, 69621, 17 Avenue Jean Capelle, Villeurbanne Cedex, France.

Chorvath, I. et al., 426—Reactive Preparation of PPE/PA-6 Blends via the Application of ϵ-Caprolactam as a Reactive Solvent, Center for Polymers and Composites, Eindhoven University of Technology, Eindhoven, 5600 MB, The Netherlands (Abstract).

Chorvath, I. et al., Chapter 20: Preparation of Poly(2,6-dimethyl-1,4-phenylene ether) (PPE) and Polyamide-6 Blends via Activated Anionic Polymerization of PPE and ϵ-Caprolactam Solutions, in Applications of Anionic Polymerization Research, ACS Symposium Series, pp. 267-290, 1998.

Cho, D. et al., Fiber Reinforced Nylon-6 Composites Produced by the Reaction Injection Pultrusion Process, Polymer Composites, vol. 17, No. 5, pp. 673-681, 1996.

Costa, G. et al., The Anionic Polymerization of 2-Pyrrolidone in Bulk and in Suspension, Makromol. Chem., vol. 182, pp. 1399-1405, 1981.

Dave, R. et al., Chemistry, Kinetics, and Rheology of Thermoplastic Resins made by Ring Opening Polymerization, Part I: Theory, in Processing of Composites, Hanser Publishers, 2000.

Dave, R. et al., Polyamides from Lactams via Anionic Ring-Opening Polymerization: 2. Kinetics, Polymer, vol. 38, No. 4, pp. 939-947, 1997.

Du, L. et al., Reactive Extrusion for the Synthesis of Nylon 12 and Maleated Low-Density Polyethylene Blends via the Anionic Ring-Opening Polymerization of Lauryllactam, Journal of Applied Polymer Science, vol. 114, pp. 2662-2672, 2009.

(Continued)

*Primary Examiner* — Jennifer A Steele

(74) *Attorney, Agent, or Firm* — Kilpatrick Townsend & Stockton LLP

(57) ABSTRACT

The present invention provides sizing compositions and methods of using the same for glass fibers used in reinforced polymeric composites produced by reactive processing techniques.

22 Claims, No Drawings

(56) References Cited

OTHER PUBLICATIONS

Hedrick, R. et al., Chapter 10: Nylon 6 RIM, in Reaction Injection Molding: Polymer Chemistry and Engineering, American Symposium Series, sponsored by Division of Polymeric Materials Science and Engineering at the $186^{th}$ Meeting of the American Chemical Society, Washington D.C., Aug. 28-Sep. 2, 1983.

Horsky, J. et al., Composites of Alkaline Poly(6-caprolactam) and Short Glass Fibers: One-Step Synthesis, Structure and Mechanical Properties, Die Angewandte Makromolekulare Chemie, vol. 264, pp. 39-47, 1999.

Joncas, S. et al., Mechanical Properties of Vacuum Infused Anionic Polyamide-6 (APA-6) Glass Fiber Composites: A Benchmark Study, SAMPE Europe Conference 2006, Mar. 27-29, Paris.

Kidd, T. et al., Rotaxane Building Blocks bearing Blocked Isocyanate Stoppers: Polyrotaxanes through Post-Assembly Chain Extensions, Angew. Chem. Int. Ed., vol. 42, pp. 3379-3383, 2003.

Lin, D. et al., A Kinetic Study of the Activated Anionic Polymerization of ϵ-Caprolactam, Polymer Engineering and Science, vol. 25, No. 18, pp. 1155-1163, 1985.

Maier, S. et al., Isocyanate-Free Route to Caprolactam-Blocked Oligomeric Isocyanates via Carbonylbiscaprolactam- (CBC-) Medicated End Group Conversion, Macromolecules, vol. 36, pp. 4727-4734, 2003.

Mateva, R. et al., Kinetics of Polymerization of ϵ-Caprolactam in the Presence of Inorganic Dispersed Additives, Eur. Polym. J., vol. 34, No. 8, pp. 1061-1067, 1998.

Menges, G. et al., Polymerization of ϵ-Caprolactam in an Extruder: Process Analysis and Aspects of Industrial Application, Polymer Engineering and Science, vol. 27, No. 16, pp. 1216-1220, 1987.

Miscevic, M. et al., Production of Nylon-6 Casting by Anionic Polymerisation of ϵ-Caprolactam, International Polymer Science and Technology, vol. 20, No. 11, pp. T/90-T/98, 1993.

Moussa, K. et al., Light-Induced Polymerization of New Highly Reactive Acrylic Monomers, Journal of Polymer Science: Part A: Polymer Chemistry, vol. 31, pp. 2197-2203, 1993.

Patent Cooperation Treaty, International Search Report, International Application No. PCT/US2010/023846, dated Jun. 2, 2010.

Patent Cooperation Treaty, Written opinion of the International Search Report, International Application No. PCT/US2010/023846, dated Jun. 2, 2010.

Pillay, S. et al., Liquid Molding of Carbon Fabric-Reinforced Nylon Matrix Composite Laminates, Journal of Thermoplastic Composite Materials, vol. 18, pp. 509-527, 2005.

Sekiguchi, H., $N^0$ 305.-Mecanisme Reactionnel de la Polymerization Catalytique Alkaline de L'α-pyrrolidone (III), Bulletin de la Societe Chimique de France, pp. 1835-1838, 1960.

Subramani, S. et al., WaterdispersibleBlockedAromaticdiisocyanateIonomers, Applied Chemistry, vol. 7, pp. 61-64, 2003.

Udipi, K. et al., Polyamides from Lactams via Anionic Ring-Opening Polymerization: 1. Chemistry and Some Recent Findings, Polymer, vol. 38, No. 4, pp. 927-938, 1997.

Van Rijswijk, K. et al., Optimisation of Anionic Polyamide-6 for Vacuum Infusion of Thermoplastic Composites: Influence of Polymerisation Temperature on Matrix Properties, Polymer Testing, vol. 25, pp. 392-404, 2006.

Van Rijswijk, K. et al., Textile Fiber-Reinforced Anionic Polyamide-6 Composites. Part II: Investigation of Interfacial Bond Formation by Short Beam Shear Test, Composites: Part A, vol. 40, pp. 1033-1043, 2009.

Van Rijswijk, K. et al., Reactively Processed Polyamide-6 Structural Composites for Automotive Applications, Disciplinary Group: Design and Production of Composite Structures (DPCS), Faculty of Aerospace Engineering, Delft University of Technology (TUDelft), Kluyverweg 1, Delft, 2629 GB, the Netherlands.

Van Rijswijk, K. et al., Thermoplastic Composite Wind Turbine Blades, Dutch Wind Workshops, Results and Future of Wind Energy Research in the Netherlands, Oct. 11-12, 2006.

Van Rijswijk, K. et al., Vacuum Infused Thermoplastic Composites for Wind Turbine Blades, Proceedings of the $27^{th}$ Riso International Symposium on Materials Science: Polymer Composite Materials for Wind Turbines, Riso National Laboratory, Roskilde, Denmark, 2006.

Van Rijswijk, K., Thermoplastic Composite Wind Turbine Blades, Vacuum Infusion Technology for Anionic Polyamide-6 Composites, Thesis, Delft University, Apr. 2007.

Zhang, C. et al., Anionic Polymerization of Lactams: A Comparative Study on Various Methods of Measuring the Conversion of—Caprolactam to Polyamide 6, Journal of Applied Polymer Science, vol. 101, pp. 1972-1981, 2006.

* cited by examiner

FIBER REINFORCED POLYMERIC COMPOSITES AND METHODS OF MAKING THE SAME

CROSS-REFERENCE TO RELATED APPLICATION

The present application claims priority pursuant to 35 U.S.C. §119(e) to U.S. Provisional Patent Application Ser. No. 61/151,683, filed Feb. 11, 2009 which is hereby incorporated by reference in its entirety.

FIELD OF THE INVENTION

The present invention relates to fiber reinforced polymeric composites produced by reactive processing techniques.

BACKGROUND OF THE INVENTION

A sizing composition operable to impart desired properties is typically applied to glass fibers subsequent to glass fiber formation. As used herein, the terms "sizing composition," "sizing," "binder composition," "binder," or "size" refer to a coating composition applied to filaments after forming and include, for example, primary sizings, secondary sizings, secondary coating compositions and other coating compositions. In some embodiments, a sizing composition is applied to filaments immediately after forming or during downstream processing. Sizing compositions may provide protection to glass filaments through subsequent processing steps.

In addition, sizing compositions can play a dual role when placed on fibers that reinforce polymeric matrices in the production of composites and other products. In some applications, a sizing composition can provide fiber protection while also providing compatibility between the fiber and the matrix polymer. For example, glass fibers in the form of woven and nonwoven fabrics, mats, rovings or chopped strands have been used to reinforce thermoplastic and thermoset resins.

Depending on the mechanical and chemical properties of a polymeric material, however, compounding glass fibers with the polymeric material can require significant amounts of time and energy. Difficulties and inefficiencies encountered in compounding can limit the amount of glass fiber incorporated into a polymeric material as well as the size of the resulting composite. Thermoplastic materials, for example, often have high viscosities requiring protracted periods to achieve acceptable impregnation of glass fiber reinforcements. Moreover, in some cases, the viscosities of a thermoplastic material can preclude complete wet out of glass fiber reinforcements and produce broken glass filaments and/or strands, thereby compromising the mechanical properties of the resulting thermoplastic composite.

In view of the inefficiencies and difficulties encountered in compounding thermoplastic materials with glass fiber reinforcements, reactive processing techniques have been developed wherein thermoplastic polymeric precursors, such as monomers, are applied to glass fibers and subsequently polymerized in a mold or during pultrusion or extrusion to yield a glass fiber reinforced thermoplastic composite. Forming a thermoplastic polymeric material in the presence of glass fibers by reactive processing techniques can avoid some of the problems associated with compounding where the thermoplastic polymeric material is formed prior to combination with the glass fibers.

Nevertheless, several disadvantages exist with thermoplastic reactive processing techniques. One disadvantage is that such techniques are not available for all thermoplastic systems. Additionally, reactive processing techniques do not solve all problems with thermoplastic viscosities. Thermoplastic gellation and other increases in polymer viscosity during reactive processing can still limit acceptable glass fiber reinforcement impregnation.

Furthermore, reactive processing techniques are very sensitive to the introduction of chemical species foreign to polymerization processes. Various components of sizing compositions applied to the reinforcing glass fibers, for example, can disrupt and/or terminate a polymerization process of a reactive processing technique. Disruption or premature termination of polymerization can produce reinforced composites with undesirable mechanical and chemical properties.

As a result, sizing compositions applied to glass fibers for protection during mechanical processing are removed from glass fiber surfaces, often by the application of heat, prior to use of the glass fibers in a reactive processing technique. Removal of the sizing composition precludes the presence of disruptive chemical species during reactive processing techniques. Heating the glass fibers to remove the sizing composition, however, mechanically weakens the glass fibers thereby precluding further processing of the fibers into various reinforcement geometries. As a result, current reactive processing techniques are limited to glass fiber reinforcements in fabric arrangements. Limitation to fabric arrangements of glass fiber reinforcements excludes application of reactive processing to other composite forming techniques such as filament winding, pultrusion, extrusion and braiding.

Furthermore, heat cleaning glass fibers can negatively impact the properties of the resulting reinforced polymeric composite. As a result of these disadvantages, the commercial production of such glass fiber reinforced thermoplastic composites has been limited.

SUMMARY

Embodiments of the present invention relate to sizing compositions for glass fibers used in reinforced polymeric composites produced by reactive processing techniques. In being subjected to a reactive processing technique, some embodiments of sizing compositions of the present invention do not disrupt or minimize disruptions to the polymerization of polymer precursors, such as monomers and/or oligomers, in the production of glass fiber reinforced polymeric composites. In some embodiments, for example, sizing compositions of the present invention do not disrupt, or minimize disruptions to, the anionic polymerization of lactams to polyamide in the production of glass fiber reinforced polyamide composites.

Reactive processing techniques, in some embodiments of the present invention, include polymeric composite production by reinforced reaction injection molding (RRIM), structural reaction injection molding (SRIM), resin transfer molding (RTM), vacuum assisted resin transfer molding (VARTM) and other reactive processing techniques. Reactive processing techniques, in some embodiments, can also include reinforced polymeric composite production by reactive pultrusion, reactive extrusion, reactive filament winding or braiding and other reactive processing techniques. Reactive processing techniques, in some embodiments of the present invention, can produce a glass fiber reinforced thermoplastic composite in a single step, wherein polymeric material formation and reinforcement occur in the same step or cycle.

Embodiments of the present invention also relate to fiber glass strands comprising at least one glass fiber at least partially coated with a sizing composition of the present invention as well as polymeric composites incorporating such fiber glass strands.

In some embodiments, the present invention provides a sizing composition for glass fibers comprising at least one polymerization activator and/or polymerization activator precursor, wherein the polymerization activator or polymerization activator precursor assists or initiates polymerization in the production of a polymeric material reinforced by the glass fibers. In comprising a polymerization activator and/or polymerization activator precursor, a sizing composition can be adapted for use with a variety of polymeric systems, including thermoplastic polymeric systems, in one or more reactive processing techniques.

In some embodiments, a sizing composition for glass fibers comprising at least one polymerization activator and/or polymerization activator precursor can assist or initiate the anionic polymerization of lactams to polyamide. In other embodiments, a sizing composition comprising a polymerization activator and/or polymerization activator precursor can assist in or initiate the polymerization of polyurethanes.

A polymerization activator and/or polymerization activator precursor, in some embodiments, can perform one or more functions. A polymerization activator, in some embodiments, for example, can lower the energy required to begin polymerization of polymer precursors in a reactive processing technique, thereby assisting in the polymerization. In some embodiments, a polymerization activator provides a chemical moiety or functionality to assist in or initiate polymerization. Moreover, a polymerization activator precursor comprises a chemical species operable to undergo physical and/or chemical reaction to produce a polymerization activator. As described herein, in some embodiments, a polymerization activator and/or polymerization activator precursor assists in or initiates polymerization at surfaces of the glass fiber.

In one embodiment, for example, a sizing composition comprises one or more blocked isocyanates. As discussed further herein, blocked isocyanates can act as a polymerization activator or a polymerization activator precursor in the anionic polymerization of lactams to polyamide. A polymerization activator comprising a blocked isocyanate, in some embodiments, can react with a catalyst comprising an alkali salt, metal salt and/or magnesium bromide (MgBr) salt of a lactam to begin the anionic polymerization of lactams to polyamide in the production of a glass fiber reinforced polyamide composite.

In another embodiment, blocked isocyanates can act as a polymerization activator or polymerization activator precursor in the production of polyurethanes.

Incorporating a polymerization activator and/or a polymerization activator precursor in a sizing composition, in some embodiments, can also reduce or eliminate an amount of activator provided in the composition of polymeric precursors applied to glass fibers in the production of glass fiber reinforced polymeric composites by reactive processing techniques. Inclusion of a blocked isocyanate component in a sizing composition of the present invention, in some embodiments, can reduce or eliminate an amount of acyllactam and/or carbamoyllactam activator provided in the lactam composition applied to glass fibers in the production of reinforced polyamide composites by the anionic polymerization of lactams.

Incorporating a polymerization activator and/or polymerization activator precursor in a sizing composition, in some embodiments, can initiate or assist polymerization at glass fiber surfaces. Initiating or assisting polymerization at glass surfaces by incorporation of a polymerization activator and/or polymerization activator precursor in a sizing composition applied to the glass fibers, in some embodiments, can alleviate problems associated with polymer viscosity by requiring the polymer precursor composition to reach glass fiber surfaces prior to polymerization. As a result, the low viscosity of the polymer precursor composition, in some embodiments, can advantageously be used to provide desirable impregnation of the glass fibers followed by polymerization initiated or assisted at fiber surfaces, thereby potentially avoiding problems associated with increasing polymer viscosity.

Furthermore, polymerization of polymer precursors at the surfaces of the glass fibers through the use of a polymerization activator and/or polymerization activator precursor in a sizing composition, in some embodiments, can reduce problems associated with crimping by providing chemical interactions or bonds between the polymer and the glass fibers as opposed to only mechanical interactions. In some embodiments, for example, a polymerization activator and/or polymerization activator precursor can chemically interact with one or more silanes bound to the glass fiber surface thereby chemically linking the polymer to the glass fiber surface at one or more locations. Increasing chemical interactions between the glass fibers and polymer can produce a composite with desirable properties, including increased fatigue resistance. In some anionic polymerizations, for example, a polymerization activator can work in conjunction with an anionic catalyst to reduce problems associated with crimping by reacting with one or more silanes bound to the glass surface thereby linking or bridging the polymer to the glass surface at one or more locations.

In some embodiments, a sizing composition comprising at least one polymerization activator and/or polymerization activator precursor further comprises a coupling agent. A coupling agent, in some embodiments, comprises a silane. In some embodiments, a silane comprises an aminosilane, epoxy silane, methacrylic silane or combinations thereof. In some embodiments, a silane comprises a blocked isocyanate functionality or an imidazol functionality. In such embodiments, a silane comprising a blocked isocyanate functionality or an imidazol functionality can serve as a polymerization activator or polymerization activator precursor and a coupling agent.

Moreover, in some embodiments, a sizing composition comprising at least one polymerization activator and/or polymerization activator precursor further comprises a protective component. A protective component, in some embodiments, protects or assists in protecting glass filaments from various sources of degradation including, but not limited to, interfilament abrasion, friction encountered in winding, unwinding and downstream contact points and degradation resulting from chopping applications.

In some embodiments, a protective component comprises one or more film formers, lubricants or combinations thereof. In some embodiments, a sizing composition comprises at least one polymerization activator and/or polymerization activator precursor, a coupling agent and a protective component.

In another aspect, the present invention provides a sizing composition for at least partially coating glass fibers reinforcing a reactively processed polymeric material, the sizing composition consisting essentially of a coupling agent and a protective component. In consisting essentially of a coupling agent and a protective component, the sizing composition does not include other components or chemical species which can disrupt or substantially disrupt polymerization of polymer precursors in the production of a reactively processed polymeric composite.

The present invention, in another embodiment, provides a sizing composition for at least partially coating glass fibers reinforcing a reactively processed polymeric material comprising a coupling agent and a protective component comprising non-quenching lubricant. A non-quenching lubricant, as used herein, comprises a lubricant that does not quench reactive chemical species in the polymerization of polymer precursors in the production of a reactively processed polymeric material reinforced by the glass fibers.

In some embodiments, a non-quenching lubricant is compatible with polymer systems produced by anionic polymerization, including the anionic polymerization of lactams to polyamide. In being compatible with polymer systems produced by the anionic polymerization, a non-quenching lubricant, in some embodiments, does not comprise functionalities operable to donate one or more protons or undergo condensation reactions.

As provided herein, some embodiments of sizing compositions of the present invention do not comprise components which disrupt or might substantially disrupt polymerization of polymer precursors in the production of a glass fiber reinforced polymeric composite by reactive processing techniques. Disruption of polymerization mechanisms by a sizing composition can produce reinforced composites with undesirable properties associated with low weight average polymer molecular weight and poor interaction between the polymer and glass fibers. In being adapted for use in reactive processing techniques, sizing compositions of the present invention are not removed or substantially removed from glass fibers prior to use in reactive processing techniques. As a result, sizing compositions of the present invention, in some embodiments, are applied to glass fibers as a primary sizing. The term "primary sizing" refers to a sizing composition applied to fibers immediately after formation of the fibers. The term "secondary sizing" refers to a sizing composition applied to fibers subsequent to the application of a primary sizing.

In some embodiments, sizing compositions of the present invention are compatible with reactive processing techniques comprising polymer systems produced by anionic polymerization. In some embodiments, for example, sizing compositions of the present invention can be used in the anionic polymerization of lactams to polyamide in the reactive production of polyamide reinforced composites. The anionic polymerization of lactams, as used herein, comprises the anionic polymerization of 3-propanolactam (β-propiolactam), 4-butanolactam (γ-butyrolactam), 5-pentanolactam (α-piperdone) or 6-hexanolactam (ϵ-caprolactam), laurolactam or any other suitable lactam or combinations thereof.

In some embodiments, sizing composition described herein are compatible with reactive processing techniques employing polyurethanes.

Moreover, in some embodiments, a sizing composition of the present invention for use in a reactive processing technique comprises one or more components operable to enhance or increase the resistance of a polymeric composite reinforced with glass fibers at least partially coated with the sizing composition against degradative environmental forces experienced by the polymeric composite, such as hydrolysis, severe temperature fluctuations and mechanical shear. In one embodiment, for example, a sizing composition comprises a coupling agent and a maleic anhydride copolymer, the maleic anhydride copolymer operable to enhance the hydrolysis resistance of an anionically polymerized polyamide composite reinforced with glass fibers at least partially coated with the sizing composition. Additionally, in some embodiments, a sizing composition comprises a lubricant, polymerization activator and/or polymerization activator precursor in addition to a coupling agent and maleic anhydride copolymer.

In some embodiments, sizing compositions of the present invention are aqueous sizing compositions.

In another aspect, embodiments of the present invention provide a fiber glass strand comprising at least one glass fiber at least partially coated with a sizing composition of the present invention.

Embodiments of the present invention also relate to a polymeric composite comprising at least one glass fiber at least partially coated with a sizing composition of the present invention disposed in a reactively processed polymeric material. In some embodiments, a polymeric composite comprises at least one glass fiber at least partially coated with a sizing composition comprising a polymerization activator, a polymerization activator precursor or a combination thereof and a reactively processed polymer, wherein the at least one coated glass fiber is at least partially disposed in the reactively processed polymer.

In another embodiment, a polymeric composite comprises at least one glass fiber at least partially coated with a sizing composition comprising a silane and a protective component and a reactively processed polymer, wherein the at least one coated glass fiber is at least partially disposed in the reactively processed polymer.

In some embodiments, the reactively processed polymer comprises an anionically polymerized polyamide. In some embodiments, the reactively processed polymer comprises a polyurethane.

In some embodiments, a fiber reinforced polymeric composite comprises at least one glass fiber at least partially coated with a sizing composition comprising a silane and a protective component, the coated glass fiber at least partially disposed in an anionically polymerized polyamide. In some embodiments, a fiber reinforced polymeric composite comprises at least one glass fiber at least partially coated with a sizing composition comprising a silane and a protective component and a polyamide anionically polymerized in the presence of the at least one coated glass fiber.

A fiber reinforced polymeric composite, in some embodiments, comprises at least one glass fiber at least partially coated with a sizing composition comprising a polymerization activator, a polymerization activator precursor or a combination thereof, the coated glass fiber at least partially disposed in an anionically polymerized polyamide. In some embodiments, a fiber reinforced polymeric composite comprises at least one glass fiber at least partially coated with a sizing composition comprising a polymerization activator, a polymerization activator precursor or a combination thereof and a polyamide anionically polymerized in the presence of the at least one coated glass fiber. A polymerization activator, in some embodiments comprises one or more blocked isocyanates. Moreover, a polymerization activator precursor, in some embodiments, comprises a blocked isocyanate or a deblocked isocyanate.

In another embodiment, a polymeric composite comprises at least one glass fiber at least partially coated with a sizing composition comprising a polymerization activator, a polymerization activator precursor or a combination thereof, the coated glass fiber at least partially disposed in a reactively processed polyurethane. A polymeric composite, in some embodiments, comprises at least one glass fiber at least partially coated with a sizing composition comprising a polymerization activator, polymerization activator precursor or a combination thereof and a polyurethane reactively processed in the presence of the at least one coated glass fiber.

In some embodiments of a reactively processed polyurethane, a polymerization activator comprises one or more isocyanates. In some embodiments of a reactively processed polyurethane, a polymerization activator precursor comprises one or more blocked isocyanates.

In another aspect, the present invention relates to methods of making a glass fiber reinforced polymeric composite. In some embodiments, a method of making a glass fiber reinforced polymeric composite comprises providing at least one glass fiber at least partially coated with a sizing composition of the present invention, at least partially contacting the at least one coated glass fiber with a composition comprising polymer precursors and polymerizing the polymer precursors to produce a polymeric material in which the at least one glass fiber is disposed. In some embodiments, the sizing composition comprises a polymerization activator, polymerization activator precursor or a combination thereof. In some embodiments, the sizing composition comprises a silane and a protective component. In some embodiments, a plurality of glass fibers at least partially coated with a sizing composition of the present invention are provided.

In some embodiments, methods of making glass fiber reinforced polymeric composites comprise methods of making glass fiber reinforced polyamide composites. In one embodiment, a method of making a fiber reinforced polyamide composite comprises providing at least one glass fiber at least partially coated with a sizing composition comprising a silane and a protective component, at least partially contacting the at least one glass fiber at least partially coated with the sizing composition with polyamide precursors and anionically polymerizing the polyamide precursors to produce a polyamide in which the at least one glass fiber is disposed.

A method of making a polyamide composite, in another embodiment, comprises providing at least one glass fiber at least partially coated with a sizing composition comprising a polymerization activator, polymerization activator precursor or a combination thereof, at least partially contacting the at least one glass fiber at least partially coated with the sizing composition with polyamide precursors and anionically polymerizing the polyamide precursors to produce a polyamide in which the at least one glass fiber is disposed.

In some embodiments, methods of making glass fiber reinforced polymeric composites comprise methods of making glass fiber reinforced polyurethane composites. A method of making a glass fiber reinforced polyurethane composite, in some embodiments, comprises providing at least one glass fiber at least partially coated with a sizing composition comprising a polymerization activator, polymerization activator precursor or a combination thereof, at least partially contacting the at least one glass fiber at least partially coated with the sizing composition with polyurethane precursors and polymerizing the polyurethane precursors to produce a polyurethane in which the at least one glass fiber is disposed.

These and other embodiments are discussed in greater detail in the detailed description which follows.

DETAILED DESCRIPTION

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Some embodiments of the present invention relate to sizing compositions for glass fibers. The sizing compositions described herein generally relate to aqueous sizing compositions. Some embodiments of sizing compositions of the present invention are compatible with a variety of polymeric materials, including thermoplastic polymeric materials produced by reactive processing techniques. Some embodiments of the present invention also relate to fiber glass strands coated with sizing compositions. Additionally, some embodiments of the present invention relate to products that incorporate fiber glass strands, such as fiber reinforced polymeric materials.

Sizing compositions present invention will be discussed generally in the context of application to glass fibers used in reactive processing techniques for the production of reinforced polymeric composites. However, one of ordinary skill in the art would understand that the present invention may be useful in the processing of other textile materials.

As provided herein, in reactive processing techniques, polymeric precursors are applied to glass fibers and subsequently polymerized to yield a reactively processed glass fiber reinforced composite. In some RRIM techniques, for example, glass particulate or short glass fiber reinforcement is provided in one or more of the polymerization reagents. The polymerization reagents are provided to mold where polymerization is conducted to form a fiber reinforced polymeric composite.

Moreover, in some SRIM techniques, a preformed reinforcing glass mat or structure is disposed in a mold. In some embodiments, a reinforcing glass mat or structure comprises fabrics of any construction including, without limitation, woven fabrics. The preformed reinforcing structure is subsequently impregnated with polymerization reagents and polymerization is conducted to produce a glass reinforced polymeric composite.

Sizing compositions of the present invention, in some embodiments, can be compatible with a variety of reactive processing techniques employing a number of polymeric systems including, but not limited to, polyureas, polyureaurethanes, polyesters, polyamides and epoxides.

A sizing composition's compatibility with a reactive processing technique can depend on a variety of factors including the identity of the polymeric system and the method of polymerization.

I. Sizing Compositions Comprising Polymerization Activator/Polymerization Activator Precursor In some embodiments, the present invention provides a sizing composition for glass fibers comprising at least one polymerization activator and/or polymerization activator precursor, wherein the polymerization activator or polymerization activator precursor assists or initiates polymerization in the production of a reactively processed polymeric material reinforced by the glass fibers. The sizing composition can be a primary sizing in some embodiments.

A polymerization activator and/or polymerization activator precursor, in some embodiments, can perform one or more functions. A polymerization activator, in some embodiments, for example, can lower the energy required to begin polymerization of polymer precursors in a reactive processing technique, thereby assisting in the polymerization. In some embodiments, a polymerization activator provides a chemical moiety or functionality to assist in or initiate polymerization. Moreover, a polymerization activator precursor comprises a chemical species operable to undergo physical and/or chemical reaction to produce a polymerization activator. As described herein, in some embodiments, a polymerization activator and/or polymerization activator precursor assists in or initiates polymerization at surfaces of the glass fiber.

Incorporating a polymerization activator and/or a polymerization activator precursor in a sizing composition, in some embodiments, can reduce or eliminate an amount of activator provided in the composition of polymeric precursors applied to glass fibers in the production of glass fiber reinforced polymeric composites by reactive processing techniques.

Moreover, incorporating a polymerization activator and/or a polymerization activator precursor in a sizing composition, in some embodiments, can facilitate production of a glass fiber reinforced polymeric composite with desirable chemical and mechanical properties from reactive processing techniques. As described herein, in reactive processing techniques, a polymer precursor composition is applied to the reinforcing glass fibers and subsequently polymerized to produce the fiber reinforced polymeric composite. Incorporating a polymerization activator and/or polymerization activator precursor in a sizing composition applied to the reinforcing glass fibers can permit the polymerization of the polymer precursors at the surfaces of the glass fibers thereby proving an enhanced distribution of polymer around the glass fibers. An enhanced distribution of polymer around the reinforcing glass fibers can reduce or eliminate voids or spaces between the glass fibers and polymer which can compromise the integrity of the composite.

Additionally, initiating or assisting polymerization at glass fibers surfaces can mitigate problems associated with polymer viscosities. In prior reactive processing techniques wherein polymerization is only initiated in the bulk of the applied polymer precursor composition, the viscosity of the growing polymer increases with time due to crystallization and/or gellation resulting in incomplete impregnation or association with the reinforcing glass fibers. In some cases, polymer crystallization suppresses polymerization leading to incomplete interaction with the reinforcing glass fibers.

Increases in polymer viscosity can additionally lead to crimp wherein mechanical interlocking is the mechanism of adhesion between the polymer and glass fibers. Given the mechanical nature of the adhesion, crimping can compromise the fatigue properties of a glass fiber reinforced composite.

Initiating or assisting polymerization at glass surfaces by incorporation of a polymerization activator and/or polymerization activator precursor in a sizing composition applied to the glass fibers can alleviate problems associated with polymer viscosity by requiring the polymer precursor composition to reach glass fiber surfaces prior to polymerization. As a result, the low viscosity of the polymer precursor composition can be taken advantage of to provide desirable impregnation of the glass fibers followed by polymerization initiated or assisted at fiber surfaces, thereby avoiding problems associated with increasing polymer viscosity.

Furthermore, polymerization of polymer precursors at the surfaces of the glass fibers through the use of a polymerization activator and/or polymerization activator precursor in a sizing composition can reduce problems associated with crimping by providing chemical interactions or bonds between the polymer and the glass fibers as opposed to only mechanical interactions. Increasing chemical interactions between the glass fibers and polymer can produce a composite with desirable properties, including increased fatigue resistance. In some anionic polymerizations, for example, a polymerization activator can work in conjunction with an anionic catalyst to reduce problems associated with crimping.

Initiating or assisting polymerization at glass fiber surfaces by incorporation of a polymerization activator and/or activator precursor in a sizing composition can have increased importance in SRIM and VARTM processes wherein the quality of a polymeric composite is dependent upon impregnation of the reinforcing structure in the mold with polymer precursor composition and/or polymeric material. For large reinforcing structures, the problems of polymer viscosity and crystallization are magnified as longer times are required to impregnate the entire structure. As a result, the size of a reinforcing structure can be limited by polymer precursor polymerization rate and resulting polymer viscosity and crystallization. As discussed herein, initiating or assisting polymerization at glass fiber surfaces can alleviate problems associated with polymer viscosity and crystallization thereby allowing larger reinforcing structures to be used. This can be important in the manufacture of large apparatuses by reactive processing techniques such as, for example, automotive parts and turbine blades for windmills and other rotating structures.

A sizing composition of the present invention can comprise any desired amount of polymerization activator and/or polymerization activator precursor compatible with one or more reactive processing techniques. In some embodiments, a sizing composition comprises a sufficient amount of polymerization activator and/or polymerization activator precursor to eliminate or substantially eliminate the need for polymerization activator in the composition of polymeric precursors applied to the glass fibers in the production of a fiber glass reinforced polymeric composite by a reactive processing technique.

Moreover, in some embodiments, a sizing composition comprises a polymerization activator and/or polymerization activator precursor in an amount up to 100 weight percent on a total solids basis. In some embodiments, a sizing composition comprises a polymerization activator and/or polymerization activator precursor in an amount up to 99 weight percent or in an amount up to 98 weight percent on a total solids basis. A sizing composition, in another embodiment, comprises a polymerization activator and/or a polymerization activator precursor in an amount of at least about 90 weight percent on a total solids basis. In some embodiments, a sizing composition comprises a polymerization activator and/or a polymerization activator precursor in an amount of at least about 60 weight percent on a total solids basis. In another embodiment, a sizing composition comprises a polymerization activator and/or polymerization activator precursor in an amount of at least about 50 weight percent on a total solids basis. In some embodiments, a sizing composition comprises a polymerization activator and/or a polymerization activator precursor in an amount greater than about 1 weight percent on a total solids basis. In some embodiments, a sizing composition comprises a polymerization activator and/or a polymerization activator precursor in an amount of at least about 10 weight percent on a total solids basis. In some embodiments, a sizing composition comprises a polymerization activator and/or polymerization activator precursor in an amount of at least about 20 weight percent on a total solids basis. In some embodiments, a sizing composition comprises a polymerization activator and/or polymerization activator precursor in an amount of at least about 30 weight percent on a total solids basis. In some embodiments, a sizing composition comprises a polymerization activator and/or polymerization activator precursor in an amount of at least about 40 weight percent on a total solids basis.

A polymerization activator and/or polymerization activator precursor can be selected according to the identity of the polymeric material produced by a reactive processing technique. In some embodiments, for example, a polymerization activator and/or polymerization activator precursor of a sizing composition is compatible with reactive processing techniques comprising polymer systems produced by anionic polymerization. In some embodiments, a polymerization activator reacts with an anionic catalyst to begin an anionic polymerization.

In one embodiment, for example, a sizing composition comprises one or more blocked isocyanates as a polymerization activator or polymerization activator precursor in the anionic polymerization of lactams to polyamide in the production of a glass fiber reinforced polyamide composite. A polymerization activator comprising a blocked isocyanate, in some embodiments, can react with a catalyst comprising an alkali salt, metal salt and/or magnesium bromide (MgBr) salt of a lactam to begin the anionic polymerization of lactams to polyamide in the production of a glass fiber reinforced polyamide composite.

As described herein, in some embodiments, a polymerization activator or polymerization activator precursor comprising a blocked isocyanate can assist or initiate polyamide formation at surfaces of the glass fibers. In some embodiments, a polymerization activator or polymerization activator precursor comprising a blocked isocyanate can chemically react or interact with a coupling agent, such as a silane, bound to the glass fiber surface, thereby chemically linking the polyamide to the glass fiber surface at one or more locations.

Depending on molecular structure, a blocked isocyanate can serve as a polymerization activator or a polymerization activator precursor. In some embodiments, a blocked isocyanate comprising an imide(carbamoyl) functionality, for example, is operable to serve as a polymerization activator. Lactam blocked isocyanates, such as caprolactam blocked isocyanates, demonstrate an imide functionality. As a result, lactam blocked isocyanates, in some embodiments, are operable to serve as a polymerization activator in the anionic polymerization of lactams to polyamide in the production of a glass fiber reinforced polyamide composite.

While not wishing to be bound by any theory, it is believed that an imide functionality of a blocked isocyanate can demonstrate a reactivity similar to the imide functionality of acyllactam and/or carbamoyllactam activator previously used in the anionic polymerization of lactams to polyamide.

As provided herein, a blocked isocyanate can also serve as a polymerization activator precursor. Blocked isocyanates lacking an imide functionality or blocked isocyanates comprising an imide functionality which have been de-blocked, in some embodiments, can serve as a polymerization activator precursor in the anionic polymerization of lactams to polyamide in the production of a glass fiber reinforced polyamide composite.

While not wishing to be bound by any theory, it is believed that a blocked isocyanate lacking an imide functionality can react with a lactam monomer to form a carbamoyllactam polymerization activator. De-blocking of an isocyanate can facilitate reaction of the isocyanate with a lactam to produce a carbamoyllactam polymerization activator. In one embodiment, for example, a de-blocked isocyanate can react with a caprolactam to produce a carbamoyllactam activator. In some embodiments, lactam for reaction with the de-blocked isocyanate is supplied from the lactam composition applied to the glass fibers in the production of a glass fiber reinforced polyamide composite by anionic polymerization of the lactam.

Similarly, a blocked isocyanate comprising an imide functionality which has become de-blocked can react with a lactam monomer to form an carbamoyllactam polymerization activator. As provided herein, de-blocking of the isocyanate can facilitate acylation of a lactam by the isocyanate to produce a carbamoyllactam polymerization activator.

The de-blocking of an isocyanate can be controlled by several factors including temperature. Various species of blocked isocyanates can de-block at different temperatures. As a result, in some embodiments wherein isocyanate de-blocking is desired to produce a polymerization activator, a blocked isocyanate having a lower de-blocking temperature can be chosen. In some embodiments, blocked isocyanates having a lower de-blocking temperature can facilitate anionic polymerization of lactams, such as caprolactam, to polyamide at lower temperatures, thereby saving energy.

In other embodiments wherein isocyanate de-blocking is not desired, a blocked isocyanate having a higher de-blocking temperature can be chosen. In some embodiments, for example, a blocked isocyanate having a de-blocking temperature higher than the anionic polymerization of the lactam can be chosen. A blocked isocyanate having a high de-blocking temperature can permit anionic polymerization of lactams to be conducted at higher temperatures thereby reducing negative effects of polyamide crystallization discussed herein.

In the preparation of blocked organic isocyanates for use in sizing compositions of the present invention, any isocyanate compatible with the anionic polymerization of lactams to polyamide can be used. In some embodiments, suitable isocyanates comprise polyisocyanates. Representative examples of organic polyisocyanates which may be suitable organic polyisocyanates, are aliphatic compounds such as trimethylene, tetramethylene, hexamethylene and butylidene diisocyanate (HDI, MDI); cycloalkyl compounds such as isophorone diisocyanate (IPDI); cycloalkylene compounds such as 1,4-cyclohexane diisocyanate (CHDI); aromatic compounds such as p-phenylene diisocyanate; aliphatic-aromatic compounds such as 4,4'-diphenylene methane diisocyanate, 2,4- or 2,6-tolylene diisocyanate or mixtures thereof.

Representative examples of higher polyisocyanates include, without limitation, triisocyanates such as triphenylmethane-4,4',4"-triisocyanate and 2,4,6-triisocyanate toluene. Additional examples of organic polyisocyanates that may be used when practicing this invention include those of the biuret type and those for which a di- or trimerization reaction has produced four-, five- or six-membered rings. Among the six-membered rings, there may be mentioned the isocyanuric rings derived from a homo- or hetero-trimerization of various diisocyanates alone, with other isocyanate(s) (e.g., mono-, di- or polyisocyanate(s)) or with carbon dioxide. In this latter case, a nitrogen from the isocyanuric ring is replaced by an oxygen. In some embodiments, for example, a biuret type isocyanate comprises a blocked HDI-biuret. In some embodiments, an isocyanurate comprises a blocked HDI or blocked IPDI isocyanurate.

In some embodiments, a silane comprising a blocked isocyanate functionality can be used as a polymerization activator or polymerization activator precursor. A silane comprising a blocked isocyanate functionality, in some embodiments, comprises blocked isocyanatoalkyltrialkoxysilanes such as blocked 3-isocyanatepropyltrimethoxysilane, blocked 3-isocyanatepropyltriethoxysilane or combinations thereof. As discussed herein, a silane comprising a blocked isocyanate functionality can serve as a polymerization activator or polymerization activator precursor and a coupling agent. As a result, in some embodiments, a sizing composition comprising a blocked isocyanate silane does not comprise an additional silane component.

A suitable isocyanate blocking agent may be determined by its ability to prevent the blocked isocyanate from reacting until a desired temperature is achieved. Representative examples of compounds which may be suitable blocking agents include, but are not limited to, oximes such as methyl ethyl ketoxime, acetone oxime and cyclohexanone oxime, lactams such as epsilon-caprolactam, and pyrazoles. Use of oximes, lactams, and pyrazoles may be desirable for some embodiments because polyisocyanates blocked with oximes, lactams, and pyrazoles can unblock and react at lower temperatures relative to polyisocyanates blocked with alcohols.

In some embodiments, a blocked isocyanate comprises an epsilon caprolactam blocked aliphatic polyisocyanate aqueous emulsion from Bayer Chemical under the trade designation NAJ-1058 or BAYBOND® RET-7270. NAJ-1058 and BAYBOND® RET-7270 are caprolactam blocked HDI biurets. In some embodiments, a blocked isocyanate comprises a caprolactam blocked HDI isocyanurate. A caprolactam blocked HDI isocyanurate is commercially available from Bayer Chemical under the trade designation BAYBOND® RSC825. In some embodiments, a blocked isocyanate comprises a ketoxime blocked HDI-isocyanurate. A ketoxime blocked HDI-isocyanurate is commercially available from Rhodia Group under the trade designation Rhodocoat WT1000. In some embodiments, a blocked isocyanate comprises a caprolactam blocked IPDI-isocyanurate. A caprolactam blocked IPDI-isocyanurate is commercially available from Evonik Degussa GmbH under the trade designation VESTANAT® DS994.

In some embodiments, a sizing composition comprises one or more acyllactams as a polymerization activator in the anionic polymerization of lactams to polyamide in the production of a glass fiber reinforced polyamide composite. In other embodiments, a sizing composition comprises one or more maleimide chemical species as a polymerization activator or polymerization activator precursor in the anionic polymerization of lactams to polyamide in the production of a glass fiber reinforced polyamide composite. In some embodiments, a maleimide chemical species is produced by reacting maleic anhydride with ammonia. In some embodiments, maleimide chemical species can be part of a polymer such as a maleic anhydride copolymer described herein.

In some embodiments, a blocked isocyanate is a polymerization activator or polymerization activator precursor for the reactive processing of polyurethanes. In some embodiments, a polymerization activator or polymerization activator precursor comprising a blocked isocyanate can initiate or assist in the production of polyurethane at glass fiber surfaces in the reactive processing of glass fiber reinforced polyurethane composites.

Depending on structure, a blocked isocyanate can serve as a polymerization activator or a polymerization activator precursor in the production of polyurethanes. In some embodiments, a blocked isocyanate that has been deblocked can serve as a polymerization activator for polyurethane systems, such as polyurethane RRIM or polyurethane long fiber injection (LFI). While not wishing to be bound by any theory, it is believed that deblocking a blocked isocyanate in the sizing composition by heating, catalyst or other technique produces one or more isocyanate functionalities operable to react with polyurethane precursors such as polyol monomers and/or urethane oligomers having free hydroxyl functionalities, thereby facilitating polyurethane production at glass fiber surfaces. Concomitantly, a blocked isocyanate, in some embodiments, can serve as a polymerization activator precursor in the production polyurethanes that undergoes a deblocking reaction to provide a polymerization activator comprising the de-blocked isocyanate.

As provided herein, the de-blocking of an isocyanate can be controlled by several factors including temperature. Various species of blocked isocyanates can de-block at different temperatures. As a result, in some embodiments wherein isocyanate de-blocking is desired to produce a polymerization activator, a blocked isocyanate having a lower de-blocking temperature can be chosen. In some embodiments, blocked isocyanates having a lower de-blocking temperature can facilitate polyurethane production at lower temperatures, thereby saving energy.

In some embodiments, a sizing composition comprising at least one polymerization activator and/or polymerization activator precursor further comprises a coupling agent. Coupling agents suitable for use in sizing compositions of the present invention can comprise any coupling agent compatible with one or more reactive processing techniques.

In some embodiments, for example, a coupling agent of a sizing composition is compatible with reactive processing techniques comprising polymer systems produced by anionic polymerization. In one embodiment, a coupling agent is compatible with the anionic polymerization of lactams to polyamide in the production of a glass fiber reinforced polyamide composite. In another embodiment, a coupling agent is compatible with reactively processed polyurethane systems.

Moreover, coupling agents of sizing compositions of the present invention can strengthen interactions between glass fibers and the polymeric material produced during reactive processing resulting in a reinforced composite having desirable properties. In some embodiments, a coupling agent comprises a silane. Silane coupling agents useful in sizing composition of the present invention, in some embodiments, comprise aminosilanes. Aminosilanes, in some embodiments, comprise aminoalkyltrialkoxysilanes. In some embodiments, aminoalkyltrialkoxysilanes comprise aminopropyltrialkoxysilanes such as γ-aminopropyltrimethoxysilane and γ-aminopropyltriethoxysilane, β-aminoethyltriethoxysilane, N-β-aminoethylaminopropyltrimethoxysilane, N-β-aminoethylaminopropylmethyldimethoxysilane, 3-aminopropyldimethoxysilane, or mixtures thereof.

Non-limiting examples of commercially available aminoalkylsilanes include A-1100 γ-aminopropyltriethoxysilane, A-1120 N-(β-aminoethyl)-γ-aminopropyltrimethoxysilane, and other aminofunctional silanes in the A-1100 series from OSi Specialties, as well as DYNASYLAN® AMEO 3-aminopropyltriethoxysilane from Degussa AG of Dusseldorf, Germany.

In another embodiment, aminosilanes comprise silanes having one or more ureido moieties. Non-limiting examples of commercially available aminosilanes comprising a ureido moiety include SILQUEST® A-1160 γ-uriedopropyl-triethoxysilane and SILQUEST® A-1524, γ-ureidopropyl-trimethoxysilane commercially available from GE Silicones of Albany, N.Y.

In some embodiments, a silane coupling agent comprises an epoxy silane. A non-limiting example of a silane comprising an epoxide moiety is GLYMO® 3-glycidoxypropyltrimethoxysilane commercially available from DeGussa AG. Additional silanes comprising epoxide functionalities that can be used in some embodiments of sizing compositions of the present invention comprise cylcohexyl epoxy silanes such as A-186 from GE Silicones.

In some embodiments, a silane coupling agent comprises a methacrylic silane such as methacryloxypropyltrialkoxy silanes. A non-limiting example of a methacrylic silane is A-174 3-methacryloxypropyltrimethoxysilane commercially available from Degussa AG of Dusseldorf, Germany.

In some embodiments, a coupling agent comprises a silane comprising an imidazol functionality. A non-limiting example of an imidazol functionalized silane is 3-4,5-dihydroimidazol-1-yl-propyltriethexosilane.

In some embodiments, a coupling agent comprises a silane comprising a blocked isocyanate functionality. A silane comprising a blocked isocyanate functionality, in some embodiments, comprises blocked isocyanatoalkyltrialkoxysilanes such as blocked 3-isocyanatepropyltrimethoxysilane, blocked 3-isocyanatepropyltriethoxysilane or combinations thereof. Non-limiting commercial examples of silane comprising a blocked isocyanate functionality include A-1310 3-isocyanatepropyltriethoxysilane and Y-11602 ter-butylalcohol blocked 3-isocyanatepropyltriethoxysilane from GE Silicones of Albany, N.Y.

A silane comprising a blocked isocyanate functionality or an imidazol functionality, in some embodiments, can serve as a polymerization activator or polymerization activator precursor and a coupling agent. As a result, in some embodiments, a sizing composition comprising a blocked isocyanate silane and/or a imidazol functionalized silane does not comprise an additional polymerization activator and/or polymerization activator precursor. In other embodiments, a sizing composition comprising a blocked isocyanate silane or an imidazol functionalized silane comprises a polymerization activator and/or polymerization activator precursor in addition to the blocked isocyanate silane.

In some embodiments, a sizing composition of the present invention comprises a plurality of coupling agents. A sizing composition, in some embodiments, for example, can comprise a mixture of aminosilanes, epoxy silanes, methacrylate silanes, imidazol functionalized silanes and/or blocked isocyanate silanes. In addition to being compatible with one or more reactive processing techniques, a coupling agent can be chosen according to compatibility with the polymeric material formed during the reactive processing. In one embodiment, aminosilanes can be used for polyamide reinforcement applications wherein the polyamide is formed from the reactive anionic polymerization of lactams.

A sizing composition of the present invention can comprise a coupling agent in any desired amount compatible with one or more reactive processing techniques. In some embodiments, a sizing composition comprises a coupling agent in an amount up to about 90 weight percent on a total solids basis. In another embodiment, a sizing composition comprises a coupling agent in an amount up to about 60 weight percent on a total solids basis. A sizing composition, in some embodiments, comprises a coupling agent in an amount up to about 45 weight percent on a total solids basis. In some embodiments, a sizing composition comprises a coupling agent in an amount greater than about 1 weight percent. In some embodiments, a sizing composition comprises a coupling agent in an amount of at least about 2 weight percent. In some embodiments, a sizing composition comprises a coupling agent in an amount greater than about 5 weight percent. In some embodiments, a sizing composition comprises a coupling agent in an amount of at least about 30 weight percent.

In some embodiments, a sizing composition comprising at least one polymerization activator and/or polymerization activator precursor further comprises a protective component. A protective component, in some embodiments, comprises one or more film formers, lubricants or combinations thereof.

A protective component of a sizing composition described herein, in some embodiments, can comprise any film former compatible with one or more reactive processing techniques. In some embodiments, a film former of a sizing composition is compatible with reactive processing techniques comprising polymer systems produced by anionic polymerization. In one embodiment, for example, a film former is compatible with the anionic polymerization of lactams to polyamide in the production of a glass fiber reinforced polyamide composite. In another embodiment, a film former is compatible with reactively processed polyurethane systems.

In some embodiments, a film former comprises a polyurethane. A polyurethane film former, in some embodiments, comprises an aqueous polyurethane solution. In some embodiments, an aqueous polyurethane solution comprises a polyether polyurethane having a molecular weight less than about 50,000. An aqueous polyurethane solution is commercially available from Hydrosize Technologies, Inc. under the trade designations HYDROSIZE® U6-01 and HYDROSIZE® U10-01.

In some embodiments, polyurethane film forming compositions are provided as aqueous dispersions such as, for example, the WITCOBOND® series provided by Crompton Corporation-Uniroyal Chemical, including, but not limited to, WITCOBOND® W-290H and WITCOBOND® W-296. Additional examples of commercially available polyurethane aqueous dispersions comprise Aquathane 516 from Reichhold Chemical Company and BAYBOND® 400S from Bayer Chemical.

A film former, in some embodiments, comprises a polyester. A polyester film former, in some embodiments, is provided as an aqueous dispersion or emulsion. An aqueous polyester dispersion is commercially available from DSM, B.V. of the Netherlands under the trade designation Neoxil 9166. In some embodiments, polyesters comprise aromatic structures such as phenolic moieties. Neoxil 954D, an aqueous emulsion of a bisphenol-A polyester, for example, is commercially available from DSM, B.V. In some embodiments, a polyester film former comprises a polyester-polyurethane film former. A polyester-polyurethane film former is commercially available from DSM B.V. under the Neoxil 9851 trade designation.

In some embodiments, a film former can comprise epoxide compositions. Suitable epoxide compositions for use as film formers, according some embodiments, comprise EPON epoxides and EPI-REZ epoxides commercially available Hexion Specialty Chemicals of Columbus, Ohio. In some embodiments, epoxide compositions comprise aromatic structures including phenolic moieties, such as bisphenol and/or bisphenol novolac epoxides. In one embodiment, for example, an phenolic epoxide composition is commercially available from DSM B.V. under the Neoxil 8294 trade designation or commercially available from Hexion Specialty chemicals under the EPI-REZ RSW-4254 trade designation.

A film former, in some embodiments, comprises a chemically modified wood rosin. In some embodiments, a chemically modified wood rosin is commercially available from Eka Chemicals AB, Sweden, under the Dynakoll SI 100T trade designation. In some embodiments, a film former comprises a chemically modified wood rosin as disclosed in United States Patent Application Publication 20070079730.

In some embodiments, a film former comprises polyvinylacetate aqueous dispersions or emulsions. A polyvinylacetate film former is commercially available from Celanese Emulsions under the trade designation RESYN® 1037.

A film former, in some embodiments, comprises aqueous olefinic emulsions or dispersions. In some embodiments, an aqueous olefinic emulsion comprises a polyethylene emulsion. In some embodiments, an aqueous olefinic emulsion comprises a polypropylene emulsion. An aqueous polypropylene emulsion is commercially available from BYK USA, Inc. under the trade designation AQUACER® 1500.

In some embodiments, a film former comprises an acrylate latex. In some embodiments, an acrylate latex is commercially available from H. B. Fuller under the trade designation FULATEX® PD2163.

A sizing composition comprising a polymerization activator and/or polymerization activator precursor, in some embodiments, comprises at least one film former in an amount up to about 50 weight percent on a total solids basis. In another embodiment, a sizing composition comprises at least one film former in an amount up to about 45 weight percent on a total solids basis. In some embodiments, a sizing composition comprises at least one film former in an amount up to about 30 weight percent on a total solids basis. In some embodiments, a sizing composition comprises at least one film former in an amount up to about 10 weight percent on a total solids basis. In some embodiments, a sizing composition comprises at least one film former in an amount of at least 1 weight percent on a total solids basis.

In some embodiments, a protective component of a sizing composition comprises a lubricant. One or more lubricants can be used, for example, to reduce inter-filament abrasion between glass fibers and reduce abrasion between glass fibers and any contact points during processing. As a result, lubricant can reduce the number of broken filaments and fuzz in glass strands used in the production of reinforced polymeric composites by reactive processing techniques in some embodiments. Moreover, a lubricant, in some embodiments, can facilitate impregnation of fiber glass strands of the present invention by polymeric precursors during reactive processing techniques.

A protective component of a sizing composition, in some embodiments, can comprise any lubricant compatible with one or more reactive processing techniques. In some embodiments, a lubricant of a sizing composition is compatible with reactive processing techniques comprising polymer systems produced by anionic polymerization. In one embodiment, for example, a lubricant is compatible with the anionic polymerization of lactams to polyamide in the production of a glass fiber reinforced polyamide composite. In another embodiment, a lubricant is compatible with reactively processed polyurethane systems.

In one embodiment, a lubricant comprises a reaction product of an alkoxylated amine and a polycarboxylic acid, which is further reacted with an epoxy compound.

A reaction product of an alkoxylated amine and a polycarboxylic acid, which is further reacted with an epoxy compound, in some embodiments, comprises a reaction product as set forth in U.S. Pat. No. 3,459,585, which is hereby incorporated by reference in its entirety.

In some embodiments, an alkoxylated amine for reaction with a polycarboxylic acid has a general formula (I):

(I)

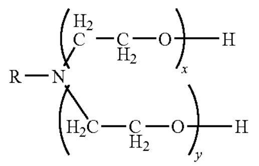

wherein R is selected from the group consisting of hydrogen, a saturated or unsaturated alkyl, -aryl, -arylalkyl, and -alkylaryl radical containing 1 to 30 carbon atoms. In some embodiments, x and y independently range from 1 to 100. In some embodiments, x and y independently range from 20 to 50. In other embodiments x and y independently range from 30 to 60.

In other embodiments, an alkoxylated amine for reaction with a polycarboxylic acid has a general formula (II):

(II)

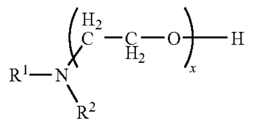

wherein $R^1$ and $R^2$ are independently selected from the group consisting of hydrogen, a saturated or unsaturated alkyl, -aryl, -arylalkyl, and -alkylaryl radical containing 1 to 30 carbon atoms. In some embodiments x ranges from 1 to 100. In some embodiments, x ranges from 20 to 50. In other embodiments, x ranges from 30 to 60.

In some embodiments, an alkoxylated amine for reaction with a polycarboxylic acid comprises an alkoxylated fatty amine. In some embodiments, for example, an alkoxylated fatty amine comprises an alkoxylated stearyl amine, an alkoxylated dodecyl amine, an alkoxylated tetradecyl amine, an alkoxylated hexadecyl amine, or an alkoxylated octadecyl amine.

In some embodiments, an alkoxylated amine for reaction with a polycarboxylic acid comprises a propoxylated amine or a butoxylated amine. Embodiments of sizing compositions of the present invention contemplate any number of carbon atoms in the alkoxy moiety (e.g. ethoxy, propoxy, butoxy, pentoxy, etc.) of the alkoxylated amine consistent with providing the sizing compositions the desired properties disclosed herein. In some embodiments, the molecular weight of an alkoxylated amine for reaction with a polycarboxylic acid can range from about 100 to about 10,000.

In some embodiments, an alkoxylated amide can be used in place of an alkoxylated amine in producing a reaction product for use in a sizing composition of the present invention. In some embodiments, an alkoxylated amide has general formula (III):

(III)

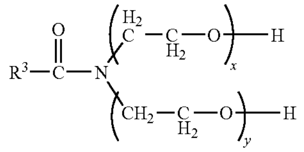

wherein $R^3$ is selected from the group consisting of a saturated or unsaturated alkyl, -aryl, -arylalkyl, and -alkylaryl radical containing 1 to 30 carbon atoms and wherein x and y independently range from 1 to 100. In some embodiments, x and y independently range from 20 to 50. In some embodiments, x and y independently range from 30 to 60.

In another embodiment, an alkoxylated amide for reaction with a polycarboxylic acid has a general formula (IV):

(IV)

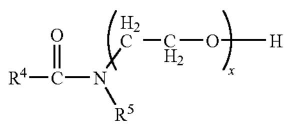

wherein $R^4$ and $R^5$ are independently selected from the group consisting of hydrogen, a saturated or unsaturated alkyl, -aryl, -arylalkyl, and -alkylaryl radical containing 1 to 30 carbon atoms and wherein x ranges from 1 to 100. In some embodiments, x ranges from 20 to 50. In some embodiments, x and y range from 30 to 60.

In some embodiments, an alkoxylated amide for reaction with a polycarboxylic acid comprises a propoxylated amine or a butoxylated amide. Embodiments of sizing compositions of the present invention contemplate any number of carbon atoms in the alkoxy moiety (e.g. ethoxy, propoxy, butoxy, pentoxy, etc.) of the alkoxylated amide consistent with providing the sizing compositions the desired properties disclosed herein. In some embodiments, the molecular weight of an alkoxylated amide for reaction with a polycarboxylic acid can range from about 100 to about 10,000.

Polycarboxylic acids suitable for reaction with an alkoxylated amine or alkoxylated amide, in some embodiments, comprise oxalic, malonic, succinic, glutaric, adipic, pimelic, suberic, azelaic, sebacic, maleic, fumaric, itaconic, citraonic, mesaconic, muconic, 1,2-cyclohexanedicarboxylic, 1,4-cyclohexanedicarboxylic, malic, tartaric, phthalic, isophthalic, terephthalic, tetrahydrophthalic, tetrachlorophthalic, tricarballylic acids, and the corresponding acid anhydrides of the foregoing acids.

A suitable epoxy compound for further reaction with the reaction product of an alkoxylated amine or alkoxylated amide and polycarboxylic acid comprises a chemical species having at least one epoxy moiety of the general formula (V):

(V)

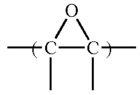

Such epoxy compounds are well know in the art and, in some embodiments, may be polymeric or oligomeric. In one embodiment, an epoxy compound comprises a polyepoxide compound such as a diglycidyl ether, diglycidyl ester, or mixtures thereof. In some embodiments, a diglycidyl ether comprises an alkyl or aromatic diglycidyl ether. In some embodiments, a diglycidyl ester comprises an alkyl or aromatic diglycidyl ester.

In some embodiments, a reaction product of an alkoxylated amine and a polycarboxylic acid, which is further reacted with an epoxy compound can be produced by reacting one mole of a primary alkoxylated amine of formula (I) with two moles of a polycarboxylic acid. The resulting reaction intermediate is subsequently reacted with two moles of an epoxy compound. While not wishing to be bound by any theory, it is believed that, in the foregoing reaction scheme, one carboxyl group of each mole of the polycarboxylic acid esterifies with one of the terminal hydroxyl groups of the alkoxylated primary amine, thereby leaving two carboxyl groups available for further reaction. Each of the available carboxyl groups is subsequently esterified by reaction with an epoxy group of the epoxy compound. In some embodiments wherein a polyepoxide compound is used, the resulting reaction product can have epoxy groups available for further reaction.

In one embodiment, for example, one mole of an alkoxylated amine is reacted with two moles of polycarboxylic acid derived from phthalic anhydride to produce the intermediate (VI) having two carboxyl groups available for further reaction.

(VI)

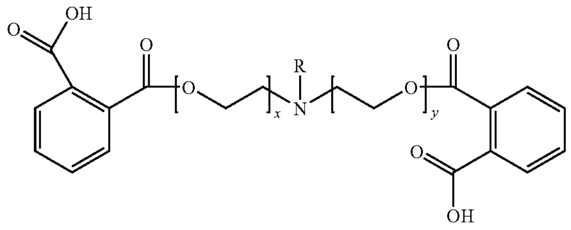

Intermediate (VI) is subsequently reacted with two moles of a Bisphenol A diglycidal ether having an epoxide equivalent of 186 to 189. The available carboxyl groups on intermediate (VI) are each esterified with by reaction with an epoxy group of the Bisphenol A diglycidal ether to produce the reaction product (VII).

(VII)

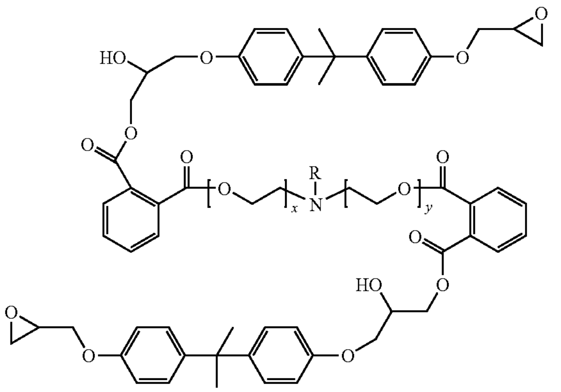

Reaction product (VII) can be incorporated into sizing compositions according to some embodiments of the present invention.

In another embodiment, a reaction product of an alkoxylated amine and a polycarboxylic acid, which is further reacted with an epoxy compound can be produced by reacting one mole of an alkoxylated amine of formula (II) with one mole of a polycarboxylic acid. The resulting intermediate product is subsequently reacted with a diepoxy compound in a 2:1 molar ratio of intermediate product to diepoxy compound. While not wishing to be bound by any theory, it is believed that, in the foregoing reaction scheme, one carboxyl group of the polycarboxylic acid esterifies with the terminal hydroxyl group of the alkoxylated secondary amine, thereby leaving at least one carboxyl group available for further reaction. The available carboxyl group is subsequently esterified by reaction with an epoxy group of the epoxy compound.

In one embodiment, for example, one mole of an alkoxylated secondary amine is reacted with one mole of polycarboxylic acid derived from phthalic anhydride to produce an intermediate having one carboxyl group available for further reaction. The intermediate is subsequently reacted with a Bisphenol A diglycidyl ether having an epoxide equivalent of 186 to 189 in a 2:1 mole ratio. Each epoxy group of the Bisphenol A diglycidal ether is subsequently esterified by the free carboxyl group of the intermediate to produce a reaction product of formula (VIII).

(VIII)

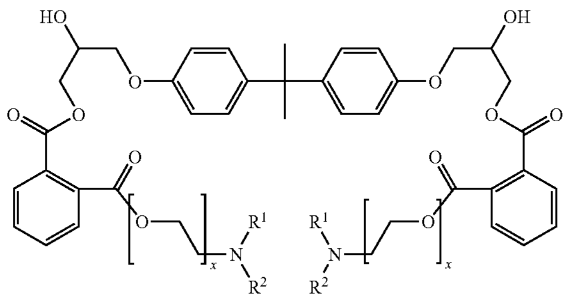

Reaction product (VIII) can be incorporated into sizing compositions according to some embodiments of the present invention.

An additional reaction product of an alkoxylated amine and a polycarboxylic acid, which is further reacted with an epoxy compound suitable for use in some embodiments of a sizing composition of the present invention is available from Hexion Specialty Chemicals of Columbus, Ohio under the designation RD1135-B.

In addition to the reaction product of an alkoxylated amine and polycarboxylic acid, which is further reacted with an epoxy compound, suitable lubricants, in some embodiments, can include non-ionic lubricants.

A sizing composition comprising a polymerization activator and/or polymerization activator precursor, in some embodiments, comprises at least one lubricant in an amount up to about 50 weight percent on a total solids basis. In another embodiment, a sizing composition comprises at least one lubricant in an amount up to about 45 weight percent on a total solids basis. In some embodiments, a sizing composition comprises at least one lubricant in an amount up to about 30 weight percent on a total solids basis. In some embodiments, a sizing composition comprises at least one lubricant in an amount up to about 10 weight percent on a total solids basis. In some embodiments, a sizing composition comprises at least one lubricant in an amount of at least 1 weight percent on a total solids basis.

In some embodiments, a sizing composition of the present invention comprises at least one polymerization activator and/or polymerization activator precursor, a coupling agent and a protective component.

II. Sizing Compositions for Reactive Polymeric Processing Having a Coupling Agent and Protective Component In another embodiment, the present invention provides a sizing composition for at least partially coating glass fibers reinforcing a reactively processed polymeric material, the sizing composition consisting essentially of a coupling agent and a protective component. As described herein, a protective component comprises one or more film formers, lubricants or combinations thereof. In consisting essentially of a coupling agent and a protective component, the sizing composition does not include other components or chemical species which can disrupt or substantially disrupt polymerization of polymer precursors in the production of a reactively processed polymeric composite.

Coupling agents and film formers and lubricants of the protective component can comprise any of those described herein. In some embodiments, a protective component of a sizing composition for at least partially coating glass fibers reinforcing a reactively processed polymeric material comprises a non-quenching lubricant. In some embodiments, a non-quenching lubricant does not quench reactive chemical species in polymeric systems produced by anionic polymerization. In one embodiment, for example, a non-quenching lubricant does not quench reactive chemical species in the anionic polymerization of lactams to polyamide in the production of a glass fiber reinforced polyamide composite.

In being compatible with polymer systems produced by anionic polymerization, a non-quenching lubricant, in some embodiments, does not comprise functional groups or moieties operable to react or interact with anionic chemical species. Moreover, in some embodiments, a non-quenching lubricant compatible with polymer systems produced by anionic polymerization, in some embodiments, does not comprise functionalities operable to donate one or more protons or undergo condensation reactions. In some embodiments, a non-quenching lubricant comprises non-ionic lubricants. Moreover, a non-quenching lubricant can be present in a sizing composition any amount recited herein for a lubricant.

Coupling agents, film formers and/or lubricants can be present in sizing compositions in any of the amounts described herein. In some embodiments, a coupling agent can be present in an amount of at least about 2 weight percent on a total solids basis. A coupling agent, in some embodiments, is present in an amount of at least about 8 weight percent on a total solids basis. In some embodiments, a coupling agent is present in an amount of at least about 20 weight percent on a total solids basis. In some embodiments, a coupling agent is present in an amount of at least about 30 weight percent on a total solids basis. A coupling agent in some embodiments, is present in an amount of at least about 40 weight percent on a total solids basis.

Moreover, in some embodiments, a film former and/or lubricant of a protective component can be present in the sizing composition an amount up to 99 weight percent on a total solids basis. In some embodiments, a film former and/or lubricant of a protective component can be present in an amount up to 98 weight percent of the sizing composition on a total solids basis. In some embodiments, a film former and/or lubricant of a protective component can be present in an amount up to 95 weight percent on a total solids basis. In some embodiments, a film former and/or lubricant of a protective component can be present in an amount up to 92 weight percent on a total solids basis. A film former and/or lubricant of a protective component, in some embodiments, can be present in an amount of at least 20 weight percent on a total solids basis. A film former and/or lubricant of a protective component, in some embodiments, can be present in an amount of at least 30 weight percent on a total solids basis.

In some embodiments, a sizing composition described in section I and/or II herein for use with a reactive polymeric processing technique comprises one or more components operable to enhance or increase the resistance of a polymeric composite reinforced with glass fibers at least partially coated with the sizing composition against degradative environmental forces experienced by the polymeric composite. In one embodiment, for example, a sizing composition comprises a coupling agent and a maleic anhydride copolymer, the maleic anhydride copolymer operable to enhance the hydrolysis resistance of an anionically polymerized polyamide composite reinforced with glass fibers at least partially coated with the sizing composition. Additionally, in some embodiments, a sizing composition comprises a lubricant, polymerization activator and/or polymerization activator precursor in addition to a coupling agent and maleic anhydride copolymer.

In one embodiment, a maleic anhydride copolymer comprises maleic anhydride monomer and monomer selected from the group consisting of ethylene, butadiene, methyl vinyl ether, and mixtures thereof. In another embodiment, a maleic anhydride copolymer comprises maleic anhydride monomer and monomer selected from the group consisting of ethylene, butadiene, and mixtures thereof. In some embodiments, the maleic anhydride copolymer comprises maleic anhydride monomer and isobutylene. In another embodiment, the maleic anhydride copolymer comprises maleic anhydride monomer and styrene (SMA).

In another embodiment, a maleic anhydride copolymer comprises maleic anhydride monomer and copolymerizable monomer, wherein a portion of the maleic anhydride copolymer is chemically modified by ammonia or a primary alkyl amine. In some embodiments, a maleic anhydride copolymer comprises maleic anhydride monomer and copolymerizable monomer, wherein a portion of the maleic anhydride copolymer is chemically modified by ammonia. In some embodiments, a maleic anhydride copolymer comprises maleic anhydride monomer and copolymerizable monomer, wherein the maleic anhydride copolymer is chemically modified by a primary alkyl amine. Chemically modifying a portion of the maleic anhydride copolymer with ammonia can convert a portion of the maleic anhydride monomers to maleimide monomers. Chemically modifying a portion of the maleic anhydride copolymer with a primary alkyl amine can convert a portion of the maleic anhydride monomers to alkyl substituted maleimide monomers.

In some embodiments, a maleic anhydride copolymer comprises maleic anhydride monomer, copolymerizable monomer, and monomer selected from the group consisting of maleimide monomer, alkyl substituted maleimide monomer, and mixtures thereof. In another embodiment, a maleic anhydride copolymer comprises maleic anhydride monomer, copolymerizable monomer, and maleimide monomer. In some embodiments, a maleic anhydride copolymer comprises maleic anhydride monomer, copolymerizable monomer, and alkyl substituted maleimide monomer.

As used herein, the term "maleic anhydride monomer" includes maleic anhydride and maleic acid in the free acid, salt, or partial salt form. As used herein, the term "partial salt" refers to maleic anhydride monomers having two carboxy groups where one carboxy group is in the free acid form and one carboxy group is converted to a salt. As used herein, the term "maleimide monomer" includes maleimide, maleic diamide, and maleic acid amide in the free acid or salt form. As used herein, the term "alkyl substituted maleimide monomer" includes N-alkyl maleimide, N,N'-dialkyl maleic diamide, and N-alkyl maleic acid amide in the free acid or salt form.

A maleic anhydride copolymer can be formed from the polymerization of maleic anhydride or maleic acid with a copolymerizable monomer such as, but not limited to, ethylene, butadiene, methyl vinyl ether, and isobutylene. As previously described, a maleic anhydride copolymer can also include terpolymers comprising maleic anhydride monomer, copolymerizable monomers, and monomer selected from the group consisting of maleimide monomer, alkyl substituted maleimide monomer, and mixtures thereof. The ratio of monomers in a maleic anhydride copolymer is not particularly limited, so long as the maleic anhydride copolymer is operable to maintain or improve the hydrolysis resistance and/or strength of a reinforced thermoplastic resin. In embodiments where the maleic anhydride copolymer is formed from a reaction mixture comprising maleic anhydride and a copolymerizable monomer, the resulting maleic anhydride copolymer can be in many instances an alternating copolymer of the two reactants. Further chemical modification of an alternating maleic anhydride copolymer produces maleic anhydride copolymers where the ratio of maleic anhydride, maleimide, and N-substituted maleimide monomers to a copolymerizable monomer is 1:1.

An aqueous solution of the maleic anhydride copolymer may be used when formulating the sizing composition.

As used herein, the term "copolymerizable monomer" refers to materials that can be copolymerized with maleic anhydride and include, but are not limited to, aliphatic olefins, vinyl ethers, vinyl acetates, and other vinyl type monomers. The copolymerizable aliphatic olefins are of the general formula:

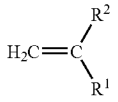

wherein $R^1$ and $R^2$ are each independently selected from the group consisting of -hydrogen, -alkyl, and -alkenyl groups having from 1 to 12 carbon atoms. Examples of aliphatic olefins suitable for copolymerizing with maleic anhydride are ethylene, butadiene, and isobutylene. An example of a vinyl ether suitable for copolymerizing with maleic anhydride is methyl vinyl ether.

As used herein, the term "primary alkyl amine" refers any compound that includes a primary amine and that is suitable for chemically modifying the maleic anhydride copolymer. Suitable primary alkyl amines may generally include butylamine, isobutylamine, propylamine, isopropylamine, ethylamine, methylamine and pentylamine, aliphatic polyamines, such as N,N-dimethylaminopropylamine, N,N-dimethylaminoethylamine, N,N-diethylaminopropylamine, N,N-diethylaminoethylamine and the like, or primary aminoalcohols such as 2-aminoethanol, 3-aminopropanol and the like.

The amount and type of maleimide monomer or N-substituted maleimide monomer in the maleic anhydride copolymer may be determined by considerations such as a desired reactivity of the maleic anhydride copolymer with a particular polyamide resin or compatibility with the anionic polymerization of lactams to polyamide. For example, a greater number of amide or imide groups in a maleic anhydride copolymer may increase the reactivity of the maleic anhydride copolymer with the amino terminal groups of a polyamide resin. Further, a greater number of amide or imide groups in a maleic anhydride copolymer may reduce the solubility of the maleic anhydride copolymer in aqueous solution. Acid derivatives such as esters may not provide acceptable reactivity with a polyamide resin relative to amides, imides, anhydrides, free acids, and salts.

In one embodiment, a maleic anhydride copolymer is an alternating copolymer of maleic anhydride monomer and ethylene. An alternating copolymer of maleic anhydride and ethylene, such as Zeemac E60, is commercially available from Zeeland Chemicals, Inc. In another embodiment, a maleic anhydride copolymer is an alternating copolymer of maleic anhydride monomer and butadiene. An alternating copolymer of maleic anhydride and butadiene known as MALDENE 286 is commerically available from Lindau Chemicals, Inc. In another embodiment, the maleic anhydride copolymer is an alternating copolymer of maleic anhydride monomer and methyl vinyl ether. In another embodiment, the maleic anhydride copolymer is an alternating copolymer of maleic anhydride monomer and isobutylene. An alternating copolymer of maleic anhydride monomer and isobutylene known as IREZ 160 is commercially available from International Specialty Products. Additionally, a copolymer of maleic anhydride and styrene is commercially available from Polyscope Polymers B.V. Netherlands under the XIRAN trade designation.

The amount of maleic anhydride copolymer in the sizing composition may depend upon various factors. For example, the lower limit of maleic anhydride copolymer may be determined by the amount effective to maintain or improve hydrolysis resistance of a reinforced thermoplastic resin. In one embodiment where sized glass fibers are used to reinforce a polyamide resin, the amount of maleic anhydride copolymer in the sizing composition effective to maintain or improve hydrolysis resistance of the polyamide resin may be greater than 1% by weight based on total solids. The upper limit of maleic anhydride copolymer may be determined by compatibility with reactive processing techniques including the anionic polymerization of lactams to polyamide in the production of a glass fiber reinforced polyamide composite.

In some embodiments, a sizing composition described in section I and/or II herein comprises a maleic anhydride copolymer in an amount up to about 80 weight percent on a total solids basis. In another embodiment, a sizing composition comprises a maleic anhydride copolymer in an amount up to about 50 weight percent on a total solids basis. A sizing composition, in some embodiments, comprises a maleic anhydride copolymer in an amount of at least about 1 weight percent on a total solids basis. In some embodiments, a sizing composition comprises a maleic anhydride copolymer in an amount of at least about 10 weight percent on a total solids basis.

In some embodiments, sizing compositions described in sections I and/or II herein have a pH ranging from about 5.0 to about 10.5. In other embodiments, sizing compositions of the present invention have a pH ranging from about 6.0 to about 8.0. In some embodiments, sizing compositions of the present invention have a pH less than about 5 or greater than about 10.5. The pH of a sizing composition, in some embodiments, is adjusted to a value within any of the foregoing pH ranges.

In some embodiments wherein a reactive processing technique comprises the production of a polymer system by anionic polymerization, an alkaline pH is desirable to reduce the potential for polymerization disruptions by the presence of hydrogen ions.

III. Sized Glass Fibers

In another aspect, embodiments of the present invention provide a fiber glass strand comprising at least one glass fiber at least partially coated with a sizing composition described herein.

As sizing compositions of the present invention are compatible with one or more reactive processing techniques, the sizing compositions, in some embodiments, can be applied to the glass fibers as a primary sizing or a secondary sizing. As a result, glass fibers receiving sizing compositions of the present invention as a primary sizing or secondary sizing, in some embodiments, have not been subjected to heat treatment to remove any sizing or other chemical species incompatible with one or more reactive processing techniques. The glass fibers, therefore, in some embodiments, can be further processed into a variety of reinforcement geometries. The ability to further process glass fibers at least partially coated with a sizing composition described herein, in some embodiments, permits application of reactive polymeric processing to additional composite formation techniques including, but not limited to, pultrusion, extrusion, filament winding and/or braiding.

As discussed herein, subjecting glass fibers to a heat treatment to remove components incompatible with a reactive processing technique can weaken the glass fibers thereby precluding further processing into various reinforcement geometries and leading to the production of a glass fiber reinforced polymeric composite with compromised mechanical properties. In some embodiments, nevertheless, sizing compositions of the present invention can be applied to glass fibers that have been previously heated or heat treated.

In one embodiment, for example, the present invention provides a fiber glass strand at least partially coated with a primary sizing composition comprising a coupling agent. The coupling agent, in some embodiments, can comprise any of the same described herein.

Glass fibers at least partially coated with a sizing composition of the present invention can have any desired length. In some embodiments, glass fibers at least partially coated with a sizing composition of the present invention have dimensions suitable for use in long fiber reinforcement applications including cast polyamide LFT applications. In another embodiment, glass fibers at least partially coated with a sizing composition of the present invention have dimensions suitable for use in RRIM processes. In some embodiments, glass fibers at least partially coated with a sizing composition of the present invention have dimensions suitable for producing mats and fabrics of any construction used in SRIM processes, including vacuum infusion processes such as vacuum assisted resin transfer molding (VARTM).

Fiber glass strands comprising at least one fiber at least partially coated with a sizing composition of the present invention, in some embodiments, can comprise chopped strands. Chopped fiber glass strands, in some embodiments, can have a length ranging from about 3 mm to about 25 mm. In other embodiments, chopped fiber glass strands can have length ranging from about 5 mm to about 25 mm. In another embodiment, chopped fiber glass strands have a length less than about 5 mm or greater than about 25 mm.

Some embodiments of fiber glass strands comprising at least one fiber at least partially coated with a sizing composition of the present invention can comprise continuous strands. Moreover, continuous fiber glass strands, according to some embodiments, can be wound into a single package such as a forming package or a direct draw package. In some embodiments, a plurality of fiber glass strands comprising at least one fiber at least partially coated with a sizing composition of the present invention are assembled into rovings.

Persons of ordinary skill in the art will recognize that the present invention can be implemented in the production, assembly, and application of a number of glass fibers. Any glass fibers known to one of skill in the art not inconsistent with the objectives of the present invention can be used.

Sizing compositions of the present invention can be applied to glass fibers by suitable methods known to one of skill in the art such as, but not limited to, by contacting the glass fibers with a static or dynamic applicator, such as a roller or belt applicator, or by spraying, or by other means. The overall concentration of the non-volatile components in the sizing composition can be adjusted over a wide range according to the means of application to be used, the character of the glass fiber to be sized and the weight of the dried size coating desired for intended use of the sized glass fibers. In some embodiment, the sizing composition can be applied to glass fibers in the forming operation of the fibers.

The amount of sizing composition on fiber glass may be measured as "loss on ignition" or "LOI". As used herein, the term "loss on ignition" or "LOI" means the weight percent of dried sizing composition present on the fiber glass as determined by Equation 1:

$$LOI=100\times[(W_{dry}-W_{bare})/W_{dry}] \quad \text{(Eq. 1)}$$

wherein $W_{dry}$ is the weight of the fiber glass plus the weight of the coating after drying in an oven at 220° F. (about 104° C.) for 60 minutes, and $W_{bare}$ is the weight of the bare fiber glass after heating the fiber glass in an oven at 1150° F. (about 621° C.) for 20 minutes and cooling to room temperature in a dessicator.

In some embodiments, a fiber glass strand of the present invention has a LOI ranging from about 0.05 and about 2.5. In another embodiment, a fiber glass strand of the present invention has a LOI ranging from about 0.1 to about 0.5. In a further embodiment, a fiber glass strand of the present invention has a LOI of about 0.4.

IV. Reactively Process Polymeric Composites

Embodiments of the present invention also provide a polymeric composite comprising at least one glass fiber at least partially coated with a sizing composition of the present invention disposed in a reactively processed polymeric material. In some embodiments, a polymeric composite comprises at least one glass fiber at least partially coated with a sizing composition comprising a polymerization activator, a polymerization activator precursor or a combination thereof and a reactively processed polymer, wherein the at least one coated glass fiber is at least partially disposed in the reactively processed polymer.

In another embodiment, a polymeric composite comprises at least one glass fiber at least partially coated with a sizing composition comprising a silane and a protective component and a reactively processed polymer, wherein the at least one coated glass fiber is at least partially disposed in the reactively processed polymer. In some embodiments, the reactively processed polymer comprises an anionically polymerized polyamide. In some embodiments, the reactively processed polymer comprises a polyurethane.

In being disposed in a reactively processed polymeric material, the at least one glass fiber, in some embodiments, is not compounded with a previously formed polymeric material. A reactively processed polymeric material is formed in the presence of the glass fiber to provide the polymeric composite. In some embodiments, forming the polymeric material in the presence of the glass fibers permits the use of polymeric materials of much higher molecular weight in comparison with polymeric materials common to traditional compounding, extrusion or injection molding methods.

As described herein, glass fibers of reactively processed polymeric composites can be provided in any desired form. Glass fibers at least partially coated with a sizing composition of the present invention, for example, can have any desired length. In some embodiments, glass fibers at least partially coated with a sizing composition of the present invention have dimensions suitable for use in long fiber reinforcement applications including cast polyamide LFT applications. In another embodiment, glass fibers at least partially coated with a sizing composition of the present invention have dimensions suitable for use in RRIM processes. In some embodiments, glass fibers at least partially coated with a sizing composition of the present invention have dimensions suitable for producing mats and fabrics of any construction used in SRIM processes, including vacuum infusion processes such as vacuum assisted resin transfer molding (VARTM). Moreover, in some embodiments, glass fibers can be provided in one or more braided arrangements or winding arrangements.

In some embodiments, a glass fiber reinforced reactively processed polymeric composite comprises any desired amount of glass fibers at least partially coated with a sizing composition of the present invention. In one embodiment, a plurality of glass fibers can be present in an amount up to about 90 weight percent of the composite. In another embodiment, the plurality of glass fibers is present in an amount up to about 80 weight percent of the composite. In some embodiments, the plurality of glass fibers are present in an amount up to about 65 weight percent of the composite. In some embodiments, the plurality of glass fibers is present in an amount greater than about 10 weight percent of the composite. In some embodiments, the plurality of glass fibers are present in an amount greater than about 20 weight percent of the composite. In another embodiment, the plurality of glass fibers are present in an amount greater than about 30 weight percent of the composite.

In some embodiments, a glass fiber reinforced reactively processed polymer composite has an interlaminar shear strength of (ILSS) of at least 20 MPa. In some embodiments, a glass fiber reinforced reactively processed polymer composite has an ILSS of at least 40 MPa. A glass fiber reinforced reactively processed polymer composite, in some embodiments, has an ILSS of at least 50 MPa. In some embodiments, a glass fiber reinforced reactively processed polymer composite has an ILSS of at least 55 MPa. A glass fiber reinforced reactively processed polymer composite, in some embodiments, has an ILSS of at least 60 MPa.

In some embodiments, a glass fiber reinforced reactively processed polymer composite has a flexural strength of at least 1000 MPa. In some embodiments, a glass fiber reinforced reactively processed polymer composite has a flexural strength of at least 1050 MPa.

In some embodiments, a glass fiber reinforced reactively processed polymer composite has a modulus (E) of at least 30 GPa. A glass fiber reinforced reactively processed polymer composite, in some embodiments, has a modulus of at least 35 GPa.

As provided herein, glass fiber reinforced polymeric composite materials can be produced by one or more reactive processing techniques including RRIM, SRIM, VARTM, reactive pultrustion or reactive compounding.

In some embodiments, a fiber reinforced polymeric composite comprises at least one glass fiber coated with a sizing composition comprising a silane and a protective component, the coated glass fiber at least partially disposed in an anionically polymerized polyamide. In some embodiments, a fiber reinforced polymeric composite comprises at least one glass fiber at least partially coated with a sizing composition comprising a silane and a protective component and a polyamide anionically polymerized in the presence of the at least one coated glass fiber.

A fiber reinforced polymeric composite, in some embodiments, comprises at least one glass fiber at least partially coated with a sizing composition comprising a polymerization activator, a polymerization activator precursor or combination thereof, the coated glass fiber at least partially disposed in an anionically polymerized polyamide. In some embodiments, a fiber reinforced polymeric composite comprises at least one glass fiber at least partially coated with a sizing composition comprising a polymerization activator, polymerization activator precursor or a combination thereof and a polyamide anionically polymerized in the presence of the at least one coated glass fiber. A polymerization activator, in some embodiments comprises one or more blocked isocyanates such as those described herein. Moreover, a polymerization activator precursor, in some embodiments, comprises a blocked isocyanate or a deblocked isocyanate.

Forming the polyamide by anionic polymerization in the presence of the at least one glass fiber, in some embodiments, provides the polyamide a significantly higher molecular weight in comparison with fiber reinforced composites formed by compounding, extruding or injection molding glass fibers with hydrolytic polyamides. A reactively processed polyamide of a glass fiber reinforced composite described herein, in some embodiments, has a molecular weight of at least about 50,000. In some embodiments, a reactively processed polyamide has a molecular weight of at least about 100,000. A reactively processed polyamide, in some embodiments, has a molecular weight of at least 500,000. In some embodiments, a reactively processed polyamide has a molecular weight of at least about 1,000,000. Moreover, a glass fiber reinforced reactively processed polyamide composite, in some embodiments, can have any of the mechanical properties described herein.

In some embodiments, a reactively processed polyamide composite comprises a polyamide 4, polyamide 6 or a polyamide 12. Additional polyamides are contemplated depending on the identity of the lactams and/or lactam derivatives used in the anionic polymerization.

In some embodiments, a polymeric composite comprising glass fibers at least partially coated with a sizing composition of the present invention disposed in a polyamide comprising anionically polymerized lactams is a cast part including, but not limited to, a pipe, tank or other vessel. In another embodiment, a polymeric composite comprising glass fibers at least partially coated with a sizing composition of the present invention disposed in a polyamide comprising anionically polymerized lactams is a rotor blade of a windmill, fan or other rotating structure. In some embodiments, a polymeric composite comprising glass fibers at least partially coated with a sizing composition of the present invention disposed in a polyamide comprising anionically polymerized lactams is an automobile part such as a hood, bumper, door, chassis or suspension part.

In another embodiment, a polymeric composite comprises at least one glass fiber at least partially coated with a sizing composition comprising a polymerization activator, polymerization activator precursor or a combination thereof, the coated glass fiber at least partially disposed in a reactively processed polyurethane. A polymeric composite, in some embodiments, comprises at least one glass fiber at least partially coated with a sizing composition comprising a polymerization activator, polymerization activator precursor or a combination thereof and a polyurethane reactively processed in the presence of the at least one coated glass fiber.

In some embodiments of a reactively processed polyurethane, a polymerization activator comprises one or more deblocked isocyanates. In some embodiments of a reactively processed polyurethane, a polymerization activator precursor comprises one or more blocked isocyanates.

In some embodiments, a reactively processed polyurethane composite comprising glass fibers at least partially coated with a sizing composition described herein is an automobile part including, but not limited to, a bumper or a body panel. In some embodiments, a reactively processed polyurethane composite comprising glass fibers at least partially coated with a sizing composition described herein is an aerodynamic part of a vehicle such as a car, truck, train or plane. An aerodynamic part, in some embodiments, is a spoiler.

A glass fiber reinforced reactively processed polyurethane composite, in some embodiments, can have any of the mechanical properties described herein.

Polymeric composites comprising glass fibers at least partially coated with a sizing composition of the present invention can be produced according to a variety of reactive processing techniques including RRIM, SRIM, VARTM, reactive pultrusion or reactive extrusion.

IV. Methods of Producing Glass Fiber Reinforced Polymeric Composites

In another aspect, the present invention provides methods of making a glass fiber reinforced polymeric composite. In some embodiments, a method of making a glass fiber reinforced polymeric composite comprises providing at least one glass fiber at least partially coated with a sizing composition of the present invention, at least partially contacting the at least one coated glass fiber with a composition comprising polymer precursors and polymerizing the polymer precursors to produce a polymeric material in which the at least one glass fiber is disposed. In some embodiments, the sizing composition comprises a polymerization activator, a polymerization activator precursor or a combination thereof. In some embodiments, the sizing composition comprises a silane and a protective component. In some embodiments, a plurality of glass fibers at least partially coated with a sizing composition of the present invention are provided.

A method of making a glass fiber reinforced polymeric composite, in some embodiments, further comprises post-curing the polymeric composite. In some embodiments, the temperature of a post-cure is at least partially dependent on the identity of the reactively processed polymeric system. In one embodiment, a post cure temperature ranges from about 160° C. to about 180° C.

In some embodiments, methods of making glass fiber reinforced polymeric composites comprise methods of making glass fiber reinforced polyamide composites. In one embodiment, a method of making a fiber reinforced polyamide composite comprises providing at least one glass fiber at least partially coated with a sizing composition comprising a silane and a protective component, at least partially contacting the at least one glass fiber at least partially coated with the sizing composition with polyamide precursors and anionically polymerizing the polyamide precursors to produce a polyamide in which the at least one glass fiber is disposed.

A method of making a polyamide composite, in another embodiment, comprises providing at least one glass fiber at least partially coated with a sizing composition comprising a polymerization activator, polymerization activator precursor or a combination thereof, at least partially contacting the at least one glass fiber at least partially coated with the sizing composition with polyamide precursors and anionically polymerizing the polyamide precursors to produce a polyamide in which the at least one glass fiber is disposed.

In some embodiments, a polymerization activator or polymerization activator precursor can comprise any of the same described herein. Moreover, in some embodiments, polyamide precursors comprise one or more lactams. Lactams in some embodiments comprise 3-propanolactam (β-propiolactam), 4-butanolactam (γ-butyrolactam), 5-pentanolactam (α-piperdone) or 6-hexanolactam (ϵ-caprolactam), laurolactam or any other suitable lactam or combinations thereof. In some embodiments, polyamide precursors comprise polyamide oligomers. Depending on the polyamide precursors employed, polyamide composites produced according to methods described herein can comprise polyamide 4, polyamide 6 or polyamide 12. Additional polyamides are contemplated depending on the identity of the lactams and/or lactam derivatives used in the anionic polymerization.

In some embodiments, methods of making glass fiber reinforced polymeric composites comprise methods of making glass fiber reinforced polyurethane composites. A method of making a glass fiber reinforced polyurethane composite, in some embodiments, comprises providing at least one glass fiber at least partially coated with a sizing composition comprising a polymerization activator, polymerization activator precursor or a combination thereof, at least partially contacting the at least one glass fiber at least partially coated with the sizing composition with polyurethane precursors and polymerizing the polyurethane precursors to produce a polyurethane in which the at least one glass fiber is disposed.

In some embodiments, a polymerization activator or polymerization activator precursor can comprise any of the same described herein. Additionally, in some embodiments, polyurethane precursors comprise isocyanates, polyols, urethane oligomers or combinations thereof.

In some embodiments, glass fibers comprising a sizing composition can be at least partially coated with a composition comprising polymer precursors by pressure infusion or vacuum infusion processes such as VARTM. Moreover, in some embodiments, glass fibers comprising a sizing composition of the present invention are heated prior to application of a composition comprising polymer precursors. In some embodiments, glass fibers are heated to a temperature sufficient to support polymerization of the polymer precursors. In being heated, the sizing composition on the glass fibers is not removed or substantially removed from the fibers.

As discussed herein, in some embodiments, a sizing composition comprises a polymerization activator and/or polymerization activator precursor. Incorporating a polymerization activator and/or polymerization activator precursor in a sizing composition applied to the reinforcing glass fibers can permit the polymerization of the polymer precursors at the surfaces of the glass fibers in methods of the present invention thereby proving an enhanced distribution of polymer around the glass fibers. An enhanced distribution of polymer around the reinforcing glass fibers can reduce or eliminate voids or spaces between the glass fibers and polymer which can compromise the integrity of the composite.

Additionally, initiating or assisting polymerization at glass fibers surfaces can mitigate problems associated with polymer viscosities discussed herein.

The low viscosity of the polymer precursor composition can be taken advantage of to provide desirable impregnation of the glass fibers followed by polymerization initiated or assisted at fiber surfaces, thereby avoiding problems associated with increasing polymer viscosity. Furthermore, initiating or assisting polymerization at glass fiber surfaces, in some embodiments of methods of the present invention, provides strong interaction between the glass fibers and the polymeric material resulting in a reinforced composite with desirable properties.

Incorporating a polymerization activator and/or polymerization activator precursor into a sizing composition can reduce or eliminate an amount of activator provided in the composition of polymeric precursors applied to glass fibers in the production of glass fiber reinforced polymeric composites by reactive processing techniques.

Coating a glass fiber with a polymer precursor composition in embodiments of methods of the present invention can be accomplished by a variety of procedures used in reactive processing techniques including injection procedures, pressurized infusion and vacuum infusion.

Some exemplary embodiments of the present invention will now be illustrated in the following specific, non-limiting examples.

Example 1

A non-limiting embodiment of a sizing composition of the present invention was prepared in accordance with the following formulation:

TABLE I

Sizing Formulation of the present invention (15 Liters)

| Component | Amount (g) |
|---|---|
| Silane[1] | 362.3 |
| Polymerization Activator[2] | 2892.9 |
| Lubricant[3] | 5062.5 |

[1]DYNASYLAN AMEO 3-aminopropyltriethoxysilane from Degussa AG of Dusseldorf, Germany

[2]NAJ-1058 from Bayer Chemical (caprolactam blocked HDI biuret)

[3]A reaction product of an alkoxylated amine and a polycarobxylic acid which is further reacted with an epoxy compound, the reaction product having Formula (VII) provided herein; alternatively available from Hexion Specialty Chemical of Columbus, Ohio under the trade designation RD1135-B.

3 liters of water were added to a mix tank and stirring was started. The silane was added to the mix tank and stirred for at least 15 minutes. Each additional component of the sizing composition was individually added to mix tank and stirred for at least 5 minutes before the addition of another component. Demineralized water was added to the mix tank to balance the sizing composition to 15 liters.

Example 2

Glass Fiber Reinforced Polyamide Comprising Anionically Polymerized Caprolactam The sizing composition of Example 1 was prepared as provided above.

Production of Unidirectional (UD) Glass Fiber Reinforced Polyamide Rod

The sizing composition of Example 1 was at least partially applied to fiber glass filaments using a sizing applicator. The fiber glass filaments were gathered into strands. A glass hank with 58 strands of 660 tex comprising the at least partially coated glass fibers was placed into a first 100 ml glass tube and heated in an oven at 140° C. for a period of at least 30 minutes. The first glass tube containing the glass hank was sealed and flushed with nitrogen at a flow rate of 5 liter/min. The first glass tube was then placed in an oil bath at 140° C. for 5 minutes.

40 grams of caprolactam and 2.3 grams of anionic caprolactam polymerization catalyst (Bruggolen C10) were added in a second 100 ml glass tube. The second glass tube was additionally sealed and flushed with nitrogen at a flow rate of 5 liter/min and placed in an oil bath at 140° C. for 5 minutes. During heating in the oil bath, the contents of the second glass tube were stirred several times. No anionic caprolactam polymerization activator outside of that contained in the sizing composition was used.

The contents of the second glass tube were subsequently added to the fiber glass strands of the first glass tube. After about 35 seconds, the coated glass fibers were drawn through a cylindrical glass tube to produce a UD rod comprising a glass fiber reinforced polyamide comprising anionically polymerized caprolactam. The UD rod had a glass content of about 70 weight percent.

The foregoing example provides the production of an anionically polymerized polyamide glass fiber reinforced composite in the absence of polymerization activator supplied with a polymer precursor composition. The polymerization activator in the sizing composition applied to the reinforcing glass fibers was sufficient to assist polymerization of the caprolactam to polyamide by reaction with the anionic lactamate catalyst (Bruggolen C10) in the first step of the polymerization.

Example 3

Non-limiting embodiments of aqueous sizing compositions of the present invention were prepared in accordance with the following formulations of Tables II and III:

TABLE II

Sizing Formulations of the present invention (8 Liters)

| Amount (g) | Sizing 1 | Sizing 2 | Sizing 3 | Sizing 4 | Sizing 5 |
|---|---|---|---|---|---|
| Silane[4] | 64.4 | 80.5 | 64.4 | 48.3 | 48.3 |
| Polymerization Activator[5] | 1028.6 | 0 | 514.3 | 0 | 0 |
| Lubricant[6] | 0 | 2250.0 | 900.0 | 0 | 0 |
| Maleic Anhydride Copolymer[7] | 0 | 0 | 0 | 600.0 | 0 |
| Maleic Anhydride Copolymer[8] | 0 | 0 | 0 | 0 | 786.9 |

[4]DYNASYLAN AMEO 3-aminopropyltriethoxysilane from Degussa AG of Dusseldorf, Germany

[5]NAJ-1058 from Bayer Chemical (caprolactam blocked HDI biuret)

[6]A reaction product of an alkoxylated amine and a polycarboxylic acid which is further reacted with an epoxy compound, the reaction product having Formula (VII) provided herein; alternatively available from Hexion Specialty Chemical of Columbus, Ohio under the trade designation RD1135-B.

[7]LM-EMA-HGZ-20% solution = 20% active solution in water of hydrolyzed ethylene maleic anhydride copolyer (Zeemac E60 from Zeeland Chemicals), neutralized with ammonia to pH of 7.5.

[8]LM-EMA-zuur = 20% active solution in water of hydrolyzed ethylene maleic anhydride copolymer (Zeemac E60 from Zeeland Chemicals)

TABLE III

Sizing Formulations of the present invention (8 Liters)

| Amount (g) | Sizing 6 | Sizing 7 | Sizing 8 |
|---|---|---|---|
| Silane[9] | 161.0 | 0 | 0 |
| Polymerization Activator[10] | 0 | 1142.9 | 571.4 |
| Lubricant[11] | 0 | 0 | 1000.0 |
| Maleic anhydride copolymer[12] | 0 | 0 | 0 |
| Maleic Anhydride copolymer[13] | 0 | 0 | 0 |

[9]DYNASYLAN AMEO 3-aminopropyltriethoxysilane from Degussa AG of Dusseldorf, Germany

[10]NAJ-1058 from Bayer Chemical (caprolactam blocked HDI biuret)

[11]A reaction product of an alkoxylated amine and a polycarboxylic acid which is further reacted with an epoxy compound, the reaction product having Formula (VII) provided herein; alternatively available from Hexion Specialty Chemical of Columbus, Ohio under the trade designation RD1135-B.

[12]LM-EMA-HGZ-20% solution = 20% active solution in water of hydrolyzed ethylene maleic anhydride copolyer (Zeemac E60 from Zeeland Chemicals), neutralized with ammonia to pH of 7.5.

[13]LM-EMA-zuur = 20% active solution in water of hydrolyzed ethylene maleic anhydride copolymer (Zeemac E60 from Zeeland Chemicals)

Each of sizing compositions 1 through 8 was prepared according to the following procedure. 3 liters of water were added to a mix tank and stirring was started. The silane was added to the mix tank and stirred for at least 15 minutes. Each additional component of the sizing composition was individually added to mix tank and stirred for at least 5 minutes before the addition of another component. Demineralized water was added to the mix tank to balance the sizing composition to 8 liters.

Example 4

Glass Fiber Reinforced Polyamide Comprising Anionically Polymerized Caprolactam

Sizing compositions 1 through 8 of the present invention were prepared in accordance with Example 3.

Production of Unidirectional (UD) Glass Fiber Reinforced Polyamide Rods

Sizing composition 1 was at least partially applied to fiber glass filaments using a sizing applicator. The fiber glass filaments were gathered into strands. A glass hank with 58 strands of 660 tex comprising the at least partially coated glass fibers was placed into a first 100 ml glass tube and heated in an oven at 140° C. for a period of at least 30 minutes. The first glass tube containing the glass hank was sealed and flushed with nitrogen at a flow rate of 5 liter/min. The first glass tube was then placed in an oil bath at 140° C. for 5 minutes.

30 grams of caprolactam and 1.5 grams of anionic caprolactam polymerization activator (Bruggolen C20) were added in a second 100 ml glass tube. 30 grams of caprolactam and 2.25 grams of anionic caprolactam polymerization catalyst (Bruggolen C10) were added in a third 100 ml glass tube. The second and third glass tubes were additionally sealed and flushed with nitrogen at a flow rate of 5 liter/min and placed in an oil bath at 140° C. for 5 minutes. During heating in the oil bath, the contents of the second and third glass tubes were stirred several times.

The contents of the third glass tube were subsequently added to the contents of the second glass tube, and the resulting mixture was added to the fiber glass strands of the first glass tube. After about 35 seconds, the coated glass fibers were drawn through a cylindrical glass tube to produce a UD rod comprising a glass fiber reinforced polyamide comprising anionically polymerized caprolactam. The UD rod had a glass content of about 70 weight percent.

A UD rod for each of sizing compositions 2 through 9 was produced according to this method.

Interlaminar Shear Strength (ILSS) Testing

Four (4) polyamide UD rods for each sizing composition 1 through 8 were produced according to the protocol above. Each rod was 14 mm in length and 6 mm in diameter. Each rod was cured for 1 hour at 140° C. and stored for several weeks under ambient conditions. For ILSS testing, each rod was cut into two pieces of about 4.8 mm in length as about 2 cm from each rod end was not used. The 4.8 mm test bars were dried under vacuum at 80° C. for 24 hours and cooled to room temperature under nitrogen.

The ILSS value for each of the 4 rods for each sizing composition (1-8) was determined according to ISO 3597-4. The results of the ILSS testing is provided in Table IV.

TABLE IV

Results of ILSS Testing

| Sizing Composition UD | Mean ILSS Value (MPa) |
|---|---|
| 1 | 50.0 |
| 2 | 63.0 |

TABLE IV-continued

| Results of ILSS Testing | |
|---|---|
| Sizing Composition UD | Mean ILSS Value (MPa) |
| 3 | 64.8 |
| 4 | 41.7 |
| 5 | 50.1 |
| 6 | 59.6 |
| 7 | 27.3 |
| 8 | 27.7 |

From the ILSS results presented in Table III, the majority of the anionically polymerized polyamide composites reinforced with glass fibers at least partially coated with sizing compositions of the present invention demonstrated significant mechanical strength. In particular, sizing composition 3 of the present invention comprising a silane, polymerization activator and lubricant demonstrated the highest mean ILSS value in the testing. Incorporation of a lubricant in the sizing composition can assist in impregnation or wetting the glass fibers with a composition comprising polymer precursors.

The lower mean ILSS values reported for anionically polymerized polyamide composites reinforced with glass fibers at least partially coated with sizing compositions 7 and 8 resulted from the absence of a silane in the sizing compositions as opposed to any disruption or incomplete anionic polymerization of the caprolactam caused by the sizing compositions. While polymerization proceeded without disruption, the absence of the silane precluded the establishment of strong interaction between the glass fibers and polyamide resin. The lack of strong interaction between the reinforcing glass fibers and polyamide produced the lower ILSS values.

Example 5

Non-limiting embodiments of aqueous sizing compositions of the present invention were prepared in accordance with the following formulations of Tables V, VI and VII:

TABLE V

| Dry Sizing Composition Formulation (% Solids) | | | | | | |
|---|---|---|---|---|---|---|
| Ingredient | 1 | 2 | 3 | 4 | 5 | 6 |
| Silane - AMEO 3-aminopropyltriethoxysilane | 8 | 8 | 8 | 8 | 8 | 8 |
| Film Former - Neoxil 954D | 92 | | | | | |
| Film Former - Neoxil 8294 | | 92 | | | | |
| Film Former - Neoxil 9166 | | | 92 | | | |
| Film Former - Neoxil 9851 | | | | 92 | | |
| Film Former - Dynakoll SI 100T | | | | | 92 | |
| Film Former - EPI-REZ ® RSW-4254 | | | | | | 92 |
| Film Former - RESYN ® 1037 | | | | | | |
| Film Former - AQUACER ® 1500 | | | | | | |
| Film Former - FULATEX ® PD2163 | | | | | | |
| Film Former - Hydrosize U06 | | | | | | |
| Film Former - Hydrosize U10 | | | | | | |
| Polymerization Activator - Rhodacoat WT1000 | | | | | | |
| Polymerization Activator - VESTANAT ® DS994 | | | | | | |
| Film Former - RD-1135B | | | | | | |
| Polymerization Activator - BAYBOND ® RET-7270 | | | | | | |
| Polymerization Activator - BAYBOND ® RSC825 | | | | | | |
| TOTAL | 100 | 100 | 100 | 100 | 100 | 100 |

TABLE VI

| Dry Sizing Composition Formulation (% Solids) | | | | | | |
|---|---|---|---|---|---|---|
| Ingredient | 7 | 8 | 9 | 10 | 11 | 12 |
| Silane - AMEO 3-aminopropyltriethoxysilane | 8 | 8 | 8 | 8 | 8 | 8 |
| Film Former - Neoxil 954D | | | | | | |
| Film Former - Neoxil 8294 | | | | | | |
| Film Former - Neoxil 9166 | | | | | | |
| Film Former - Neoxil 9851 | | | | | | |
| Film Former - Dynakoll SI 100T | | | | | | |
| Film Former - EPI-REZ ® RSW-4254 | | | | | | |
| Film Former - RESYN ® 1037 | 92 | | | | | |
| Film Former - AQUACER ® 1500 | | 92 | | | | |
| Film Former - FULATEX ® PD2163 | | | 92 | | | |
| Film Former - Hydrosize U06 | | | | 92 | | |
| Film Former - Hydrosize U10 | | | | | 92 | |
| Polymerization Activator - Rhodacoat WT1000 | | | | | | |
| Polymerization Activator - VESTANAT ® DS994 | | | | | | |
| Film Former - RD-1135B | | | | | | 46 |
| Polymerization Activator - BAYBOND ® RET-7270 | | | | | | 46 |
| Polymerization Activator - BAYBOND ® RSC825 | | | | | | |
| TOTAL | 100 | 100 | 100 | 100 | 100 | 100 |

TABLE VII

| Dry Sizing Composition Formulation (% Solids) | | | | | | |
|---|---|---|---|---|---|---|
| Ingredient | 13 | 14 | 15 | 16 | 17 | 18 |
| Silane - AMEO 3-aminopropyltriethoxysilane | 8 | 8 | 8 | 8 | 8 | 8 |
| Film Former - Neoxil 954D | | | | | | |
| Film Former - Neoxil 8294 | | | | | | |
| Film Former - Neoxil 9166 | | | | | | |
| Film Former - Neoxil 9851 | | | | | | |
| Film Former - Dynakoll SI 100T | | | | | | |
| Film Former - EPI-REZ ® RSW-4254 | | | | | | |
| Film Former - RESYN ® 1037 | | | | | | |
| Film Former - AQUACER ® 1500 | | | | | | |
| Film Former - FULATEX ® PD2163 | | | | | | |
| Film Former - Hydrosize U06 | | 46 | | | | |

TABLE VII-continued

| Dry Sizing Composition Formulation (% Solids) | | | | | | |
|---|---|---|---|---|---|---|
| Ingredient | 13 | 14 | 15 | 16 | 17 | 18 |
| Film Former - Hydrosize U10 | | | 46 | | | |
| Polymerization Activator - Rhodacoat WT1000 | | | | | 46 | |
| Polymerization Activator - VESTANAT ® DS994 | | | | 46 | | |
| Film Former - RD-1135B | 46 | | | 46 | 46 | 92 |
| Polymerization Activator - BAYBOND ® RET-7270 | | 46 | 46 | | | |
| Polymerization Activator - BAYBOND ® RSC825 | 46 | | | | | |
| TOTAL | 100 | 100 | 100 | | | |

Example 6

Glass Fiber Reinforced Polyamide Comprising Anionically Polymerized Caprolactam Production of Unidirectional (UD) Glass Fiber Reinforced Polyamide Rods Sizing composition 1 of Table V was at least partially applied to fiber glass filaments using a sizing applicator. The fiber glass filaments were gathered in the fiber glass strands. A glass hank of about 14 cm with 58 strands of 660 tex comprising the at least partially coated fiber glass filaments was provided having a glass content of about 70%. To provide a mild sizing composition curing, the hank was dried under vacuum at 30° C. for 18 hours and then dried under vacuum at 50° C. for 1 hour. After the vacuum was released, the hank was ready for use in making a UD rod.

The formulation to produce a polyamide 6 UD rod was 60 g caprolactam with 2.25 g C-10 (sodium caprolactamate) (Bruggolen) as catalyst and 1.5 g C-20 (blocked isocyanate HDCL in caprolactam) (Bruggolen) as activator.

Two test tubes were used to melt the caprolactam. The first test tube contained 30 grams of caprolactam and 2.25 g of catalyst C-10. The second test tube also contained 30 g of caprolactam and 1.5 g of activator C-20. Both first and second test tubes were placed in heating oil at about 140° C. A third test tube was placed in the same heating oil (140° C.) and contained the glass UD hank and glass tube. All three test tubes were closed and flushed with a continuous flow (5 L/min) of nitrogen. The caprolactam melted in about 3 minutes, and the first and second test tubes were gently stirred for an additional 2 minutes to heat the liquid therein to 110° C. After passage of the 5 minutes, the nitrogen was released from the first and second test tubes, and the contents of the first and second test tubes were mixed. The mixed contents were then immediately poured into the third test tube comprising the glass UD-hank. After about 50 seconds, the impregnated glass UD-hank was pulled gently into the glass tube and post cured for one hour at 180° C.

After post curing at 180° C., the UD-rod was cooled to room temperature. The glass tube was subsequently released.

A UD rod for each of sizing compositions 2-18 was produced according to this method.

Interlaminar Shear Strength (ILSS) Testing

ILSS testing was conducted in accordance with the procedure set forth in Example 4 above. The results of the ILSS testing is provided in Table VIII.

TABLE VIII

| Results of ILSS Testing | |
|---|---|
| Sizing Composition UD | Mean ILSS Value (MPa) |
| 1 | 47.4 |
| 2 | 47.6 |
| 3 | 52.0 |
| 4 | 42.2 |
| 5 | 31.6 |
| 6 | 39.9 |
| 7 | 18.4 |
| 8 | 18.5 |
| 9 | 26.3 |
| 10 | 55.3 |
| 11 | 52.2 |
| 12 | 56.1 |
| 13 | 52.2 |
| 14 | 58.3 |
| 15 | 58.3 |
| 16 | 51.3 |
| 17 | 44.0 |
| 18 | 23.5 |

From the ILSS results presented in Table VIII, a number of anionically polymerized polyamide composites reinforced with glass fibers at least partially coated with sizing compositions described herein having a variety of components demonstrate significant mechanical strength. The mechanical strengths exhibited by the anionically polymerized polyamide composites of the present examples provides evidence of the compatibility of sizing compositions described herein with reactive polymeric processing techniques.

Moreover, incorporating a polymerization activator in the sizing composition can inhibit impregnation problems associated with polymer viscosity and crystallization thereby leading to the production of a reinforced polymeric composite with desirable properties such high ILSS values, high flexural strength and high modulus.

Sizing compositions described herein, in some embodiments, provide protection to glass fibers during mechanical processing, such as fiber winding, unwinding and weaving, while not disrupting or minimizing disruption to polymerization of polymer precursors during reactive processing techniques. As a result, the heat treatment of glass fibers to remove sizing compositions incompatible with reactive processing techniques is avoided, thereby precluding the undesirable weakening of glass fibers used in the reinforcement of the resulting polymeric material.

Desirable characteristics, which can be exhibited by embodiments of the present invention, can include, but are not limited to, the provision of sizing compositions adapted for use in reactive processing techniques which include components operable to protect the structural integrity of glass fiber strands during mechanical processing; the provision of reactively processed polymeric composites exhibiting desirable mechanical and chemical properties which are reinforced with glass fibers at least partially coated with sizing compositions of the present invention; the provision of methods for producing reactively processed polymeric composite materials reinforced with glass fibers at least partially coated with sizing compositions of the present invention; as well as the provision of methods of reducing the amount of polymerization activator used in polymer precursor compositions applied to glass fiber in reactive processing techniques; and/or others.

Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention.

That which is claimed is:

1. A fiber reinforced polymeric composite comprising:

at least one glass fiber at least partially coated with a sizing composition, the sizing composition comprising a blocked hexamethylene diisocyanate biuret in an amount of at least 30 weight percent on a total solids basis and an aminosilane in an amount of at least 1 weight percent on a total solids basis; and a polymer, anionically polymerized in the presence of the at least one glass fiber, wherein the at least one sized glass fiber is at least partially disposed in the polymer, and wherein the polymer initiates on the surface of the at least one sized glass fiber.

2. The fiber reinforced polymeric composite of claim 1, wherein the blocked hexamethylene diisocyanate biuret is present in the sizing composition in an amount of up to about 98 percent by weight on a total solids basis.

3. The fiber reinforced polymeric composite of claim 2, wherein the blocked hexamethylene diisocyanate biuret is present in the sizing composition in an amount of at least about 50 percent by weight on a total solids basis.

4. The fiber reinforced polymeric composite of claim 1, wherein the blocking group of the blocked hexamethylene diisocyanate biuret is selected from the group consisting of a caprolactam, a ketoxime, a lactam and an oxime.

5. The fiber reinforced polymeric composite of claim 1, wherein the aminosilane comprises one or more aminoalkyltrialkoxysilanes.

6. The fiber reinforced polymeric composite of claim 1, wherein the aminosilane is present in the sizing composition in an amount of at least two weight percent on a total solids basis.

7. The fiber reinforced polymeric composite of claim 1, wherein the polymer comprises a polyamide.

8. The fiber reinforced polymeric composite of claim 1, wherein polymer comprises a polyurethane.

9. The fiber reinforced polymeric composite of claim 1, wherein the sizing composition further comprises a protective component.

10. The fiber reinforced polymeric composite of claim 9, wherein the protective component comprises a film former, a lubricant or a combination thereof.

11. A fiber reinforced polymeric composite comprising:

at least one glass fiber at least partially coated with a sizing composition, the sizing composition comprising a blocked hexamethylene diisocyanate biuret in an amount of at least 30 weight percent on a total solids basis and an aminosilane in an amount of at least 1 weight percent on a total solids basis; and a polyamide, anionically polymerized in the presence of the at least one glass fiber, wherein the polyamide initiates on the surface of the at least one sized glass fiber.

12. The fiber reinforced polymeric composite of claim 11, wherein the blocked hexamethylene diisocyanate biuret is present in the sizing composition in an amount up to about 98 weight percent on a total solids basis.

13. The fiber reinforced polymeric composite of claim 12, wherein the blocked hexamethylene diisocyanate biuret is present in the sizing composition in an amount of at least about 50 weight percent on a total solids basis.

14. The fiber reinforced polymeric composite of claim 11, wherein the aminosilane comprises one or more aminoalkyltrialkoxysilanes.

15. The fiber reinforced polymeric composite of claim 11, wherein the aminosilane is present in the sizing composition in an amount of at least about two weight percent on a total solids basis.

16. A fiber reinforced polymeric composite comprising:

at least one glass fiber at least partially coated with a sizing composition, the sizing composition comprising an aminosilane, a blocked hexamethylene diisocyanate biuret, and a protective component, wherein the sizing composition comprises the blocked hexamethylene diisocyanate biuret in an amount of at least 30 weight percent on a total solids basis, and comprises the aminosilane in an amount of at least 1 weight percent on a total solids basis; and a polyamide, anionically polymerized in the presence of the at least one glass fiber, wherein the at least one sized glass fiber is at least partially disposed in the polyamide, and wherein the polyamide initiates on the surface of the at least one sized glass fiber.

17. The fiber reinforced polymeric composite of claim 16, wherein the aminosilane is present in the sizing composition in an amount of at least about 2 weight percent on total solids basis.

18. The fiber reinforced polymeric composite of claim 16, wherein the protective component comprises a film former, a lubricant or a combination thereof.

19. The fiber reinforced polymeric composite of claim 16, wherein the protective component is present in the sizing composition in an amount up to about 95 weight percent on a total solids basis.

20. The fiber reinforced polymeric composite of claim 19, wherein the protective component is present in the sizing composition in an amount of at least about 30 weight percent on a total solids basis.

21. The fiber reinforced polymeric composite of claim 10, wherein the film former is a polyurethane.

22. The fiber reinforced polymeric composite of claim 18, wherein the film former is a polyurethane.

* * * * *